US 11,795,876 B2

(12) United States Patent
Sato et al.

(10) Patent No.: US 11,795,876 B2
(45) Date of Patent: Oct. 24, 2023

(54) OUTLET SEAL, OUTLET SEAL SET, AND GAS TURBINE

(71) Applicant: MITSUBISHI HEAVY INDUSTRIES, LTD., Tokyo (JP)

(72) Inventors: Kenji Sato, Yokohama (JP); Kiyoshi Fujimoto, Yokohama (JP); Norihiko Motoyama, Yokohama (JP); Akihiro Murakami, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/639,409

(22) PCT Filed: Aug. 12, 2020

(86) PCT No.: PCT/JP2020/030693
§ 371 (c)(1),
(2) Date: Mar. 1, 2022

(87) PCT Pub. No.: WO2021/049238
PCT Pub. Date: Mar. 18, 2021

(65) Prior Publication Data
US 2022/0290610 A1 Sep. 15, 2022

(30) Foreign Application Priority Data
Sep. 13, 2019 (JP) .................. 2019-167162

(51) Int. Cl.
*F02C 7/18* (2006.01)
*F01D 9/02* (2006.01)
(Continued)

(52) U.S. Cl.
CPC ................ *F02C 7/18* (2013.01); *F01D 9/023* (2013.01); *F01D 11/001* (2013.01); *F01D 25/12* (2013.01);
(Continued)

(58) Field of Classification Search
CPC .......... F01D 9/02; F01D 9/023; F01D 11/001; F01D 11/005; F01D 25/12; F01D 25/24;
(Continued)

(56) References Cited

U.S. PATENT DOCUMENTS 5,417,545 A * 5/1995 Harrogate ............... F01D 5/186
60/757
6,751,962 B1 6/2004 Kuwabara et al.
(Continued)

FOREIGN PATENT DOCUMENTS

DE 600 13 936 2/2006
EP 1 035 377 9/2000
(Continued)

OTHER PUBLICATIONS

International Search Report dated Oct. 6, 2020 in International Application No. PCT/JP2020/030693, with English-language translation.

(Continued)

*Primary Examiner* — Loren C Edwards
(74) *Attorney, Agent, or Firm* — Wenderoth, Lind & Ponack, L.L.P.

(57) ABSTRACT

An outlet seal connects a combustor that combusts a fuel to generate combustion gas and a shroud for a stator. The outlet seal has a gas path surface, a first connection section, and a second connection section. The shape of the gas path surface in a cross section perpendicular to an axis is an arc centered on the axis. The first connection section is formed at a first side in an axial direction and is connected to the combustor. The second connection section is formed at a second side in the axial direction and is connected to the shroud. The gas path surface has an inclined surface that is inclined with respect to the axis in a cross section including the axis, such (Continued)

that the flow-path area of a combustion-gas flow path is reduced toward the second side.

15 Claims, 9 Drawing Sheets

(51) Int. Cl.
    *F01D 11/00*     (2006.01)
    *F01D 25/12*     (2006.01)
    *F01D 25/24*     (2006.01)
    *F02C 7/28*     (2006.01)

(52) U.S. Cl.
    CPC ............... *F01D 25/24* (2013.01); *F02C 7/28* (2013.01); *F05D 2240/11* (2013.01); *F05D 2240/24* (2013.01); *F05D 2240/35* (2013.01); *F05D 2240/55* (2013.01); *F05D 2260/20* (2013.01)

(58) Field of Classification Search
    CPC .......... F01D 25/25; F01D 25/246; F02D 7/18; F02D 7/28; F05D 2240/11; F05D 2240/24; F05D 2240/35; F05D 2240/55; F05D 2260/20; F05D 2250/314
    See application file for complete search history.

(56) References Cited

U.S. PATENT DOCUMENTS

| | | |
|---|---|---|
| 2004/0139746 A1 | 7/2004 | Soechting et al. |
| 2005/0241314 A1 | 11/2005 | Takaya et al. |
| 2016/0131041 A1* | 5/2016 | Wassynger ............. F01D 9/023 60/796 |
| 2016/0160667 A1 | 6/2016 | Brown et al. |
| 2016/0201472 A1* | 7/2016 | Okajima ................... F01D 9/04 29/889.7 |
| 2018/0347385 A1 | 12/2018 | Kishida et al. |

FOREIGN PATENT DOCUMENTS

| | | |
|---|---|---|
| JP | 59-144125 | 9/1984 |
| JP | 6-317102 | 11/1994 |
| JP | 2000-257862 | 9/2000 |
| JP | 2004-84601 | 3/2004 |
| JP | 2004-225688 | 8/2004 |
| JP | 2005-30680 | 2/2005 |
| JP | 2007-107540 | 4/2007 |
| JP | 4174615 | 11/2008 |
| JP | 2016-89830 | 5/2016 |
| JP | 2017-53252 | 3/2017 |
| JP | 2019-90355 | 6/2019 |

OTHER PUBLICATIONS

Written Opinion of the International Searching Authority dated Oct. 6, 2020 in International Application No. PCT/JP2020/030693, with English-language translation.

* cited by examiner $\alpha o1 \geq \alpha o2 \geq \alpha o3$

OUTLET SEAL, OUTLET SEAL SET, AND GAS TURBINE

TECHNICAL FIELD

The present invention relates to an outlet seal that connects a combustor that combusts fuel to generate combustion gas, and a shroud of a stator vane of a turbine into which the combustion gas from the combustor flows, an outlet seal set, and a gas turbine including an outlet seal.

Priority is claimed on Japanese Patent Application No. 2019-167162, filed Sep. 13, 2019, the content of which is incorporated herein by reference.

BACKGROUND ART

A gas turbine includes a compressor that compresses air to generate compressed air; a combustor that combusts fuel in the compressed air to generate combustion gas; and a turbine that is driven by the combustion gas. The combustor includes a burner that sprays the fuel, and a transition piece that delivers the combustion gas generated by the combustion of the fuel to the turbine. The turbine includes a turbine rotor that rotates around an axis; a turbine casing that covers the rotor; and a plurality of stator vane rows. The turbine rotor includes a rotor shaft around the axis, and a plurality of rotor blade rows attached to the rotor shaft. The plurality of rotor blade rows are arranged in an axial direction where the axis extends. Each of the rotor blade rows includes a plurality of rotor blades arranged in a circumferential direction with respect to the axis. The plurality of stator vane rows are arranged in the axial direction, and are attached to an inner peripheral side of the turbine casing. Each of the plurality of stator vane rows is disposed on an axial upstream side of one rotor blade row of the plurality of rotor blade rows. Each of the plurality of stator vane rows also includes a plurality of stator vanes arranged in the circumferential direction with respect to the axis.

A shroud of a first stage stator vane forms a stator vane row located on a most axial upstream side among the plurality of stator vane rows, and is connected to a flange of the transition piece of the combustor by an outlet seal (or transition piece seal).

PTL 1 below discloses an outlet seal. The outlet seal includes an outer outlet seal and an inner outlet seal. The outer outlet seal connects a portion of the flange of the transition piece on a radial outer side with respect to the above-described axis and an outer shroud of the first stage stator vane. In addition, the inner outlet seal connects a portion of the flange of the transition piece on a radial inner side with respect to the above-described axis and an inner shroud of the first stage stator vane. Both the outlet seals include a gas path surface that defines a part of an outer edge of a combustion gas flow path through which the combustion gas flows; a combustor connecting portion to be connected to the flange of the transition piece; and a stator vane connecting portion to be connected to the shroud of the first stage stator vane. A gas path surface of the inner outlet seal has an inclined surface that is gradually inclined toward the radial inner side as the inclined surface extends from the axial upstream side toward an axial downstream side in a cross section including the axis. Namely, the inclined surface is inclined with respect to the axis such that a flow path area of the combustion gas flow path increases.

CITATION LIST

Patent Literature

[PTL 1] Japanese Unexamined Patent Application Publication No. 2004-225688

SUMMARY OF INVENTION

Technical Problem

From the viewpoint of efficiency of the turbine, it is desirable that a pressure loss in the process of delivering the combustion gas from the transition piece to the first stage stator vane is reduced. In addition, from the viewpoint of suppressing thermal damage of components, it is desirable that the outflow of the combustion gas to a gap between the outlet seal and components to be connected is suppressed.

Therefore, an object of the present invention is to provide an outlet seal, an outlet seal set, and a gas turbine including an outlet seal which are capable of reducing a pressure loss and of suppressing the outflow of combustion gas to a gap between components to be connected.

Solution to Problem

According to one aspect of the invention, in order to achieve the above object, there is provided an outlet seal that connects a combustor that combusts fuel to generate combustion gas, and a shroud of a stator vane of a turbine into which the combustion gas from the combustor flows. The outlet seal includes a gas path surface that has a circular arc shape around an axis in a cross section perpendicular to the axis, and that defines a part of an outer edge of a combustion gas flow path through which the combustion gas flows; a first connecting portion formed on a first side, of the first side and a second side, in an axial direction where the axis extends, to be connected to the combustor; and a second connecting portion formed on the second side in the axial direction to be connected to the shroud. The gas path surface has an inclined surface that is inclined with respect to the axis in a cross section including the axis such that a flow path area of the combustion gas flow path decreases from the first side toward the second side.

Depending on the gas turbine, a second side portion of a gas path surface of a transition piece of the combustor including an end on the second side may be inclined with respect to the axis in a cross section including the axis such that a combustion gas flow path area decreases toward the second side. Further, a first side portion of a gas path surface of a shroud including an end on the first side may be inclined with respect to the axis in a cross section including the axis such that a combustion gas flow path area decreases toward the second side. In such a case, when the outlet seal according to this aspect is used, the combustion gas that has flowed along the second side portion of the gas path surface of the transition piece smoothly flows along the gas path surface of the outlet seal. Further, the combustion gas that has flowed along the gas path surface of the outlet seal smoothly flows along the first side portion of the gas path surface of the shroud.

Therefore, in this aspect, a pressure loss in the process of delivering the combustion gas from the transition piece to the stator vane can be reduced. Further, in this aspect, the outflow of the combustion gas to a gap between the outlet seal and the transition piece and the outflow of the combustion gas to a gap between the outlet seal and the shroud can be suppressed.

Here, in the outlet seal according to this aspect, the second connecting portion may include a shroud fitting groove that is recessed to the first side. In this case, the shroud fitting groove is defined by a first groove side surface and a second groove side surface that extend in the axial direction and that face each other in a radial direction with respect to the axis, and a groove bottom surface that connects the first side in the first groove side surface and the first side in the second groove side surface and that faces the second side. The first groove side surface faces opposite to the gas path surface in the radial direction. The inclined surface has a first side inclined surface that is present on the first side from a groove presence region where the first groove side surface is present in the axial direction, and a second side inclined surface that is present in the groove presence region in the axial direction and that is continuous with the first side inclined surface.

In the outlet seal according to this aspect, a distance in the radial direction between the second side inclined surface and the first groove side surface may gradually increase toward the second side.

In the outlet seal according to this aspect, a distance in the radial direction between the first groove side surface and the second groove side surface may be larger than a shortest distance in the radial direction between the second side inclined surface and the first groove side surface.

A part of the shroud enters the shroud fitting groove. Accordingly, it is difficult for the combustion gas flowing through the combustion gas flow path to leak to the outside. In this aspect, the shortest distance in the radial direction between the second side inclined surface and the first groove side surface is smaller than the distance that is a groove width of the shroud fitting groove. As a result, a position where a part of the shroud enters the shroud fitting groove is provided at a position closer to the combustion gas flow path in the radial direction with respect to the axis. Therefore, the combustion gas flowing through the combustion gas flow path can be prevented from leaking to the outside at a position close to the combustion gas flow path in the radial direction with respect to the axis. Namely, the combustion gas of the combustion gas flow path can be prevented from entering the gap between the outlet seal and the shroud. For this reason, the combustion gas of the combustion gas flow path can be better prevented from entering the gap between the outlet seal and the shroud than when the combustion gas flowing through the combustion gas flow path is prevented from leaking to the outside at a position far from the combustion gas flow path in the radial direction with respect to the axis. Accordingly, a distance by which the combustion gas of the combustion gas flow path enters the gap between the outlet seal and the shroud is shortened, so that an increase in the temperature of the outlet seal and of the shroud can be suppressed. Further, when the combustion gas enters the gap between the outlet seal and the shroud, the amount of cooling air required to purge out the entered combustion gas can also be reduced.

In the outlet seal according to any one of the above aspects, at least a part of the first side inclined surface on the first side may be present in a region where the shroud fitting groove is present in the radial direction.

In the outlet seal according to any one of the above aspects, a second inclined line where an imaginary plane including the axis and the second side inclined surface intersect with each other may be parallel to a first inclined line where the imaginary plane and the first side inclined surface intersect with each other.

The outlet seal according to any one of the above aspects may further include an opposite gas path surface facing opposite to the gas path surface in a radial direction with respect to the axis; and a cooling air passage extending between the gas path surface and the opposite gas path surface in a direction including a directional component of the axial direction. In this case, the cooling air passage includes an inlet that is open in the opposite gas path surface.

In the outlet seal according to this aspect, a distance in the radial direction between the cooling air passage and the gas path surface may gradually decrease toward the second side.

In this aspect, a portion on the second side of the gas path surface can be efficiently cooled by the cooling air flowing through the cooling air passage.

In the outlet seal according to any one of the above aspects, the first connecting portion may include a combustor fitting groove that is recessed to an opposite gas path side that is opposite to the combustion gas flow path with respect to the gas path surface in a radial direction with respect to the axis. In this case, the combustor fitting groove is defined by a first groove side surface and a second groove side surface that extend in the radial direction and that face each other in the axial direction, and a groove bottom surface that connects an end on the opposite gas path side in the first groove side surface and an end on the opposite gas path side in the second groove side surface and that faces a gas path side that is a side on which the combustion gas flow path is present with respect to the gas path surface in the radial direction. The first groove side surface of the combustor fitting groove extends from an end on the first side in the gas path surface to the opposite gas path side, and faces the first side.

In the outlet seal according to any one of the above aspects, the gas path surface may face a radial inner side with respect to the axis, and the inclined surface in the gas path surface may be inclined to approach the axis as the inclined surface extends from the first side toward the second side.

In the outlet seal according to any one of the above aspects, the gas path surface may face a radial outer side with respect to the axis, and the inclined surface in the gas path surface may be inclined away from the axis as the inclined surface extends from the first side toward the second side.

According to one aspect of the invention, in order to achieve the above object, there is provided an outlet seal set including:

an outer outlet seal that is the outlet seal according to the aspect of which the gas path surface faces the radial inner side with respect to the axis; and an inner outlet seal that is the outlet seal according to the aspect of which the gas path surface faces the radial outer side with respect to the axis. In this case, an angle between the inclined surface in the gas path surface of the inner outlet seal and the axis may be different from an angle between the inclined surface in the gas path surface of the outer outlet seal and the axis.

According to one aspect of the invention, in order to achieve the above object, there is provided a gas turbine including:

the outlet seal according to any one of the above aspects; the combustor; and the turbine. The combustor includes a transition piece extending in a direction including a directional component of the axial direction, and a burner that sprays fuel into a combustion space that is a space on an inner peripheral side of the transition piece. The turbine includes a turbine rotor that rotates around the axis, a turbine casing that covers the turbine rotor, and a plurality of stator vane rows attached to the turbine casing. The turbine rotor includes a rotor shaft around the axis and a plurality of rotor blade rows attached to the rotor shaft. The plurality of rotor blade rows are arranged in the axial direction. Each of the plurality of stator vane rows is disposed on an axial upstream side from one rotor blade row of the plurality of rotor blade rows with respect to the axis. Each of the plurality of stator vane rows includes a plurality of stator vanes arranged in a circumferential direction with respect to the axis. Each of the plurality of stator vanes includes a vane body extending in a radial direction with respect to the axis, and the shroud formed at an end of the vane body in the radial direction. The outlet seal connects the transition piece of the combustor and the shroud of a first stage stator vane of a first stage stator vane row located on a most axial upstream side among the plurality of stator vane rows. The first side in the axial direction is the axial upstream side, and the second side in the axial direction is an axial downstream side opposite to the axial upstream side in the axial direction.

Here, in the gas turbine according to this aspect, the shroud of the first stage stator vane has a shroud gas path surface that faces a side on which the vane body is present with respect to the shroud gas path surface, and that defines a part of an outer edge of a combustion gas flow path through which the combustion gas flows. In addition, the transition piece includes a cylinder that extends in a direction including a directional component of the axial direction to form the combustion space on an inner peripheral side of the cylinder, and a flange protruding from the axial downstream side of the cylinder toward an outer peripheral side of the cylinder. An inner peripheral surface of the cylinder forms a combustor gas path surface that defines an outer edge of the combustion space. The outlet seal connects the shroud of the first stage stator vane and the flange of the transition piece such that the gas path surface is continuous with a part of the combustor gas path surface in a direction including a directional component of the axial direction and the gas path surface is continuous with a part of the shroud gas path surface in a direction including a directional component of the axial direction.

In the gas turbine according to this aspect, the combustor gas path surface has a seal continuous gas path surface that is a portion on the axial downstream side of the combustor gas path surface, and that is continuous with the gas path surface of the outlet seal in a direction including a directional component of the axial direction. The shroud gas path surface has a seal continuous gas path surface that is a portion on the axial upstream side of the shroud gas path surface, and that is continuous with the gas path surface of the outlet seal in a direction including a directional component of the axial direction. In the cross section including the axis, an angle of the seal continuous gas path surface of the combustor gas path surface with respect to the axis is equal to or greater than an angle of the inclined surface with respect to the axis, and in the cross section, an angle of the seal continuous gas path surface of the shroud gas path surface with respect to the axis is equal to or less than the angle of the inclined surface with respect to the axis.

Alternatively, in the cross section including the axis, the angle of the seal continuous gas path surface of the combustor gas path surface with respect to the axis is equal to or less than the angle of the inclined surface with respect to the axis, and in the cross section, the angle of the seal continuous gas path surface of the shroud gas path surface with respect to the axis is equal to or greater than the angle of the inclined surface with respect to the axis.

In the gas turbine according to this aspect, an angle difference between the angle of the seal continuous gas path surface of the combustor gas path surface with respect to the axis and the angle of the inclined surface with respect to the axis, and an angle difference between the angle of the seal continuous gas path surface of the shroud gas path surface with respect to the axis and the angle of the inclined surface with respect to the axis may be 20° or less.

In this aspect, the angle difference between the angle of the seal continuous gas path surface of the transition piece with respect to the axis and the angle of the inclined surface of the outlet seal with respect to the axis, and the angle difference between the angle of the seal continuous gas path surface of the shroud with respect to the axis and the angle of the inclined surface of the outlet seal with respect to the axis are small. For this reason, in this aspect, the combustion gas that has flowed along the seal continuous gas path surface of the transition piece smoothly flows along the gas path surface of the outlet seal. Further, the combustion gas that has flowed along the gas path surface of the outlet seal smoothly flows along the seal continuous gas path surface of the shroud.

In the gas turbine according to any one of the above aspects, the seal continuous gas path surface of the shroud gas path surface may have an inclined surface that is inclined with respect to the axis in the cross section including the axis such that a flow path area of the combustion gas flow path decreases from the axial upstream side toward the axial downstream side.

Advantageous Effects of Invention

According to one aspect of the present invention, a pressure loss in the process of delivering the combustion gas from the combustor to the first stage stator vane can be reduced, and the outflow of the combustion gas to a gap between components to be connected can be suppressed.

DESCRIPTION OF EMBODIMENTS

Hereinafter, various embodiments of the present invention and modification examples thereof will be described in detail with reference to the drawings.

[Embodiment of Gas Turbine]

An embodiment of a gas turbine will be described with reference to FIGS. 1 to 4.

Figure 1:
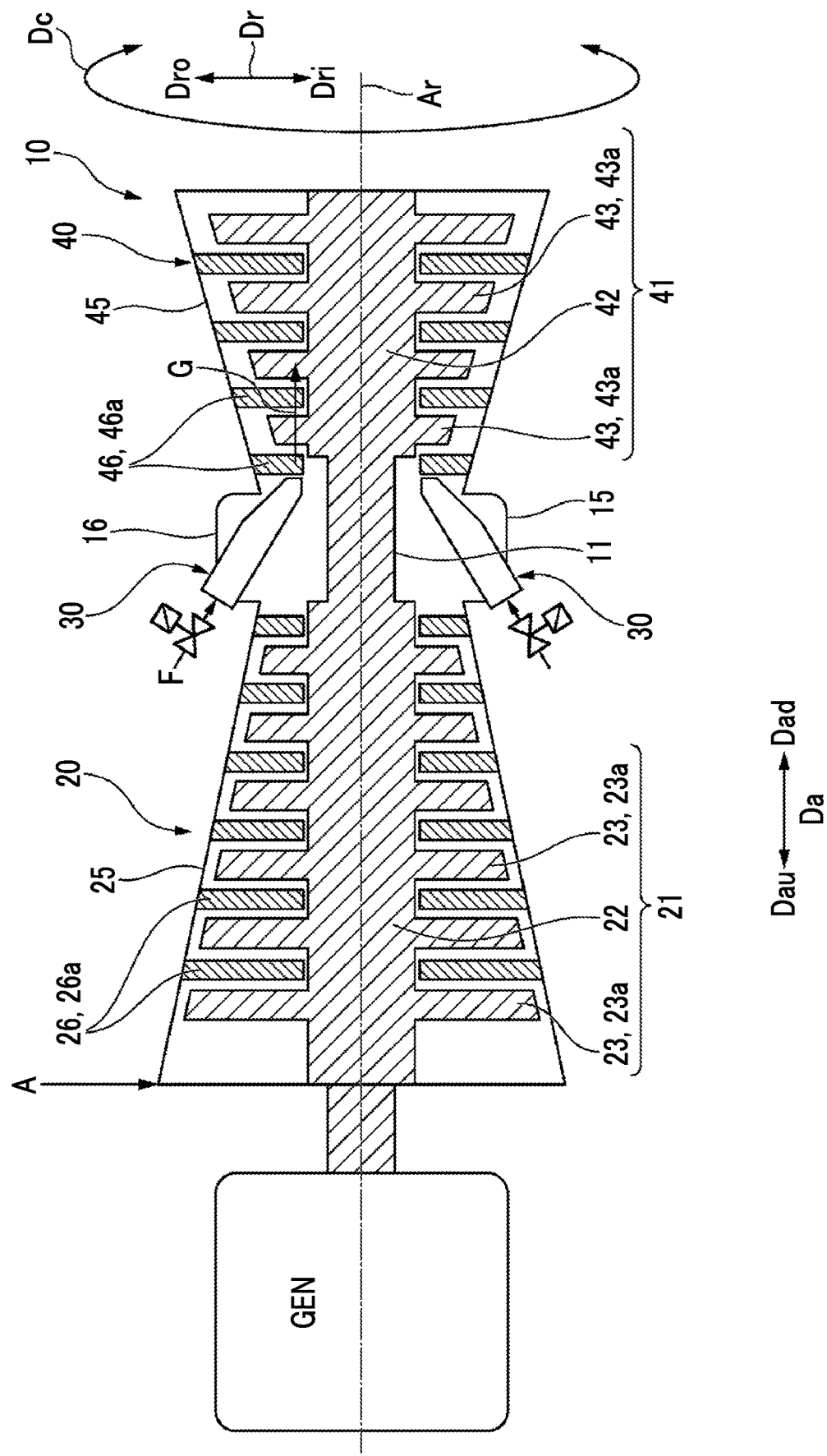
FIG. 1 is a schematic cross-sectional view of a gas turbine according to one embodiment of the present invention.

As illustrated in FIG. 1, a gas turbine 10 of the present embodiment includes a compressor 20 that compresses air A; a plurality of combustors 30 that combusts fuel F in the air A compressed by the compressor 20, to generate combustion gas G; and a turbine 40 that is driven by the combustion gas G.

The compressor 20 includes a compressor rotor 21 that rotates around an axis Ar; a compressor casing 25 that covers the compressor rotor 21; and a plurality of stator vane rows 26. The turbine 40 includes a turbine rotor 41 that rotates around the axis Ar; a turbine casing 45 that covers the turbine rotor 41; and a plurality of stator vane rows 46. Hereinafter, a direction in which the axis Ar extends is referred to as an axial direction Da, a circumferential direction around the axis Ar is simply referred to as a circumferential direction Dc, and a direction perpendicular to the axis Ar is referred to as a radial direction Dr. In addition, one side in the axial direction Da is referred to as an axial upstream side Dau, and an opposite side is referred to as an axial downstream side Dad. In addition, a side approaching the axis Ar in the radial direction Dr is referred to as a radial inner side Dri, and an opposite side is referred to as a radial outer side Dro.

The compressor 20 is disposed on the axial upstream side Dau with respect to the turbine 40.

The compressor rotor 21 and the turbine rotor 41 are located on the same axis Ar, and are connected to each other to form a gas turbine rotor 11. For example, a rotor of a generator GEN is connected to the gas turbine rotor 11. The gas turbine 10 further includes an intermediate casing 16. The intermediate casing 16 is disposed between the compressor casing 25 and the turbine casing 45 in the axial direction Da. The compressor casing 25, the intermediate casing 16, and the turbine casing 45 are connected to each other to form a gas turbine casing 15.

The compressor rotor 21 includes a rotor shaft 22 extending in the axial direction Da around the axis Ar, and a plurality of rotor blade rows 23 attached to the rotor shaft 22. The plurality of rotor blade rows 23 are arranged in the axial direction Da. Each of the rotor blade rows 23 is formed of a plurality of rotor blades 23a arranged in the circumferential direction Dc. One stator vane row 26 of the plurality of stator vane rows 26 is disposed on the axial downstream side Dad of each of the plurality of rotor blade rows 23. Each of the stator vane rows 26 is provided inside the compressor casing 25. Each of the stator vane rows 26 is formed of a plurality of stator vanes 26a arranged in the circumferential direction Dc.

Figure 2:
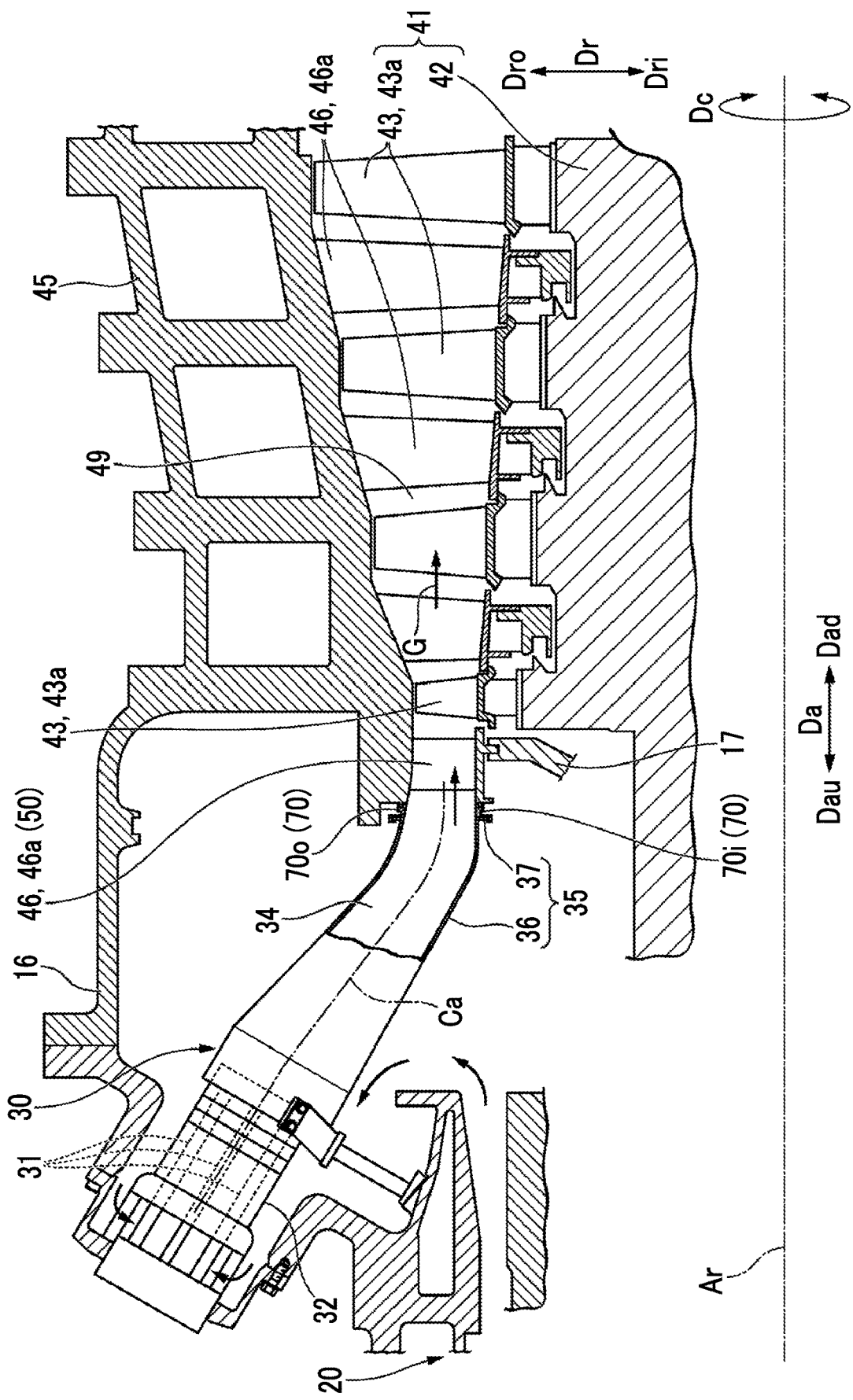
FIG. 2 is a cross-sectional view of a main part of the gas turbine according to one embodiment of the present invention.

As illustrated in FIGS. 1 and 2, the turbine rotor includes a rotor shaft 42 extending in the axial direction Da around the axis Ar, and a plurality of rotor blade rows 43 attached to the rotor shaft 42. The plurality of rotor blade rows 43 are arranged in the axial direction Da. Each of the rotor blade rows 43 is formed of a plurality of rotor blades 43a arranged in the circumferential direction Dc. One stator vane row 46 of the plurality of stator vane rows 46 is disposed on the axial upstream side Dau of each of the plurality of rotor blade rows 43. Each of the stator vane rows 46 is provided inside the turbine casing 45. Each of the stator vane rows 46 is formed of a plurality of stator vanes 46a arranged in the circumferential direction Dc.

An annular space which is formed between an outer peripheral side of the rotor shaft 42 and an inner peripheral side of the turbine casing 45 and in which the stator vanes 46a and the rotor blades 43a are disposed in the axial direction Da forms a combustion gas flow path 49 through which the combustion gas G from the combustors 30 flows. The combustion gas flow path 49 forms an annular shape around the axis Ar and is long in the axial direction Da.

The plurality of combustors 30 are arranged around the axis Ar in the circumferential direction Dc, and are attached to the intermediate casing 16. As illustrated in FIG. 2, the combustor 30 includes a transition piece 35 in which fuel is combusted; a plurality of burners 31 that spray the fuel into the transition piece 35; and a burner frame 32 that supports the plurality of burners 31. The transition piece 35 includes a cylinder 36 having a tubular shape around a combustor axis Ca, and a flange 37 protruding from one end of the cylinder 36 to an outer peripheral side. The burner frame 32 is mounted to the other end of the cylinder 36. An inner peripheral side of the cylinder 36 forms a combustion space 34. The cylinder extends in a direction including a directional component of the axial downstream side Dad in a state where the combustor 30 is attached to the intermediate casing 16. The flange 37 is provided at a downstream end on the axial downstream side Dad of the cylinder 36.

A first stage stator vane 46a that forms a first stage stator vane row 46 located on the most axial upstream side Dau among the plurality of stator vane rows 46, and the flange 37 of the transition piece 35 are connected to each other by an outlet seal 70. Hereinafter, the first stage stator vane 46a is simply referred to as a stator vane 50.

Figure 3:
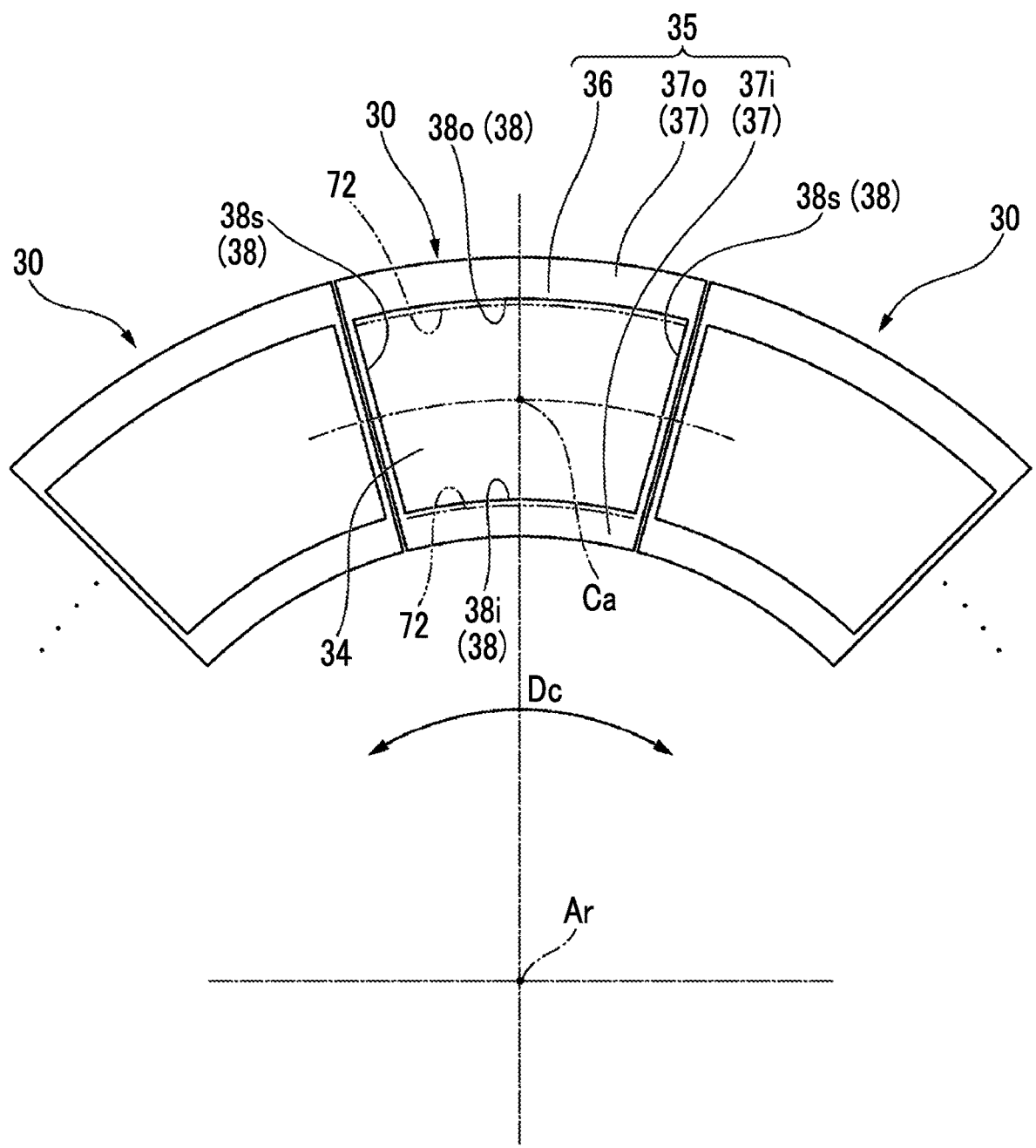
FIG. 3 is a view of a plurality of combustors according to one embodiment of the present invention when viewed from an axial downstream side.

A shape of the other end of the cylinder 36 to which the burner frame 32 is mounted is a substantially circular shape around the combustor axis Ca (refer to FIG. 2) when viewed in the axial direction Da. On the other hand, a shape of one end of the cylinder 36 at which the flange 37 is formed is a substantially isosceles trapezoidal shape as illustrated in FIG. 3 when viewed in the axial direction Da. A gas path surface (combustor gas path surface) 38 that is an inner peripheral surface of the cylinder 36 defines an outer edge of the combustion space 34. The gas path surface 38 has an outer gas path surface (combustor outer gas path surface) 38o, an inner gas path surface (combustor inner gas path surface) 38i, and a pair of peripheral gas path surfaces (combustor peripheral gas path surfaces) 38s. The outer gas path surface 38o corresponds to a lower base of the isosceles trapezoidal shape. The inner gas path surface 38i corresponds to an upper base of the isosceles trapezoidal shape. However, the outer gas path surface 38o and the inner gas path surface 38i are not flat surfaces but circular arc surfaces around the axis Ar.

Figure 4:
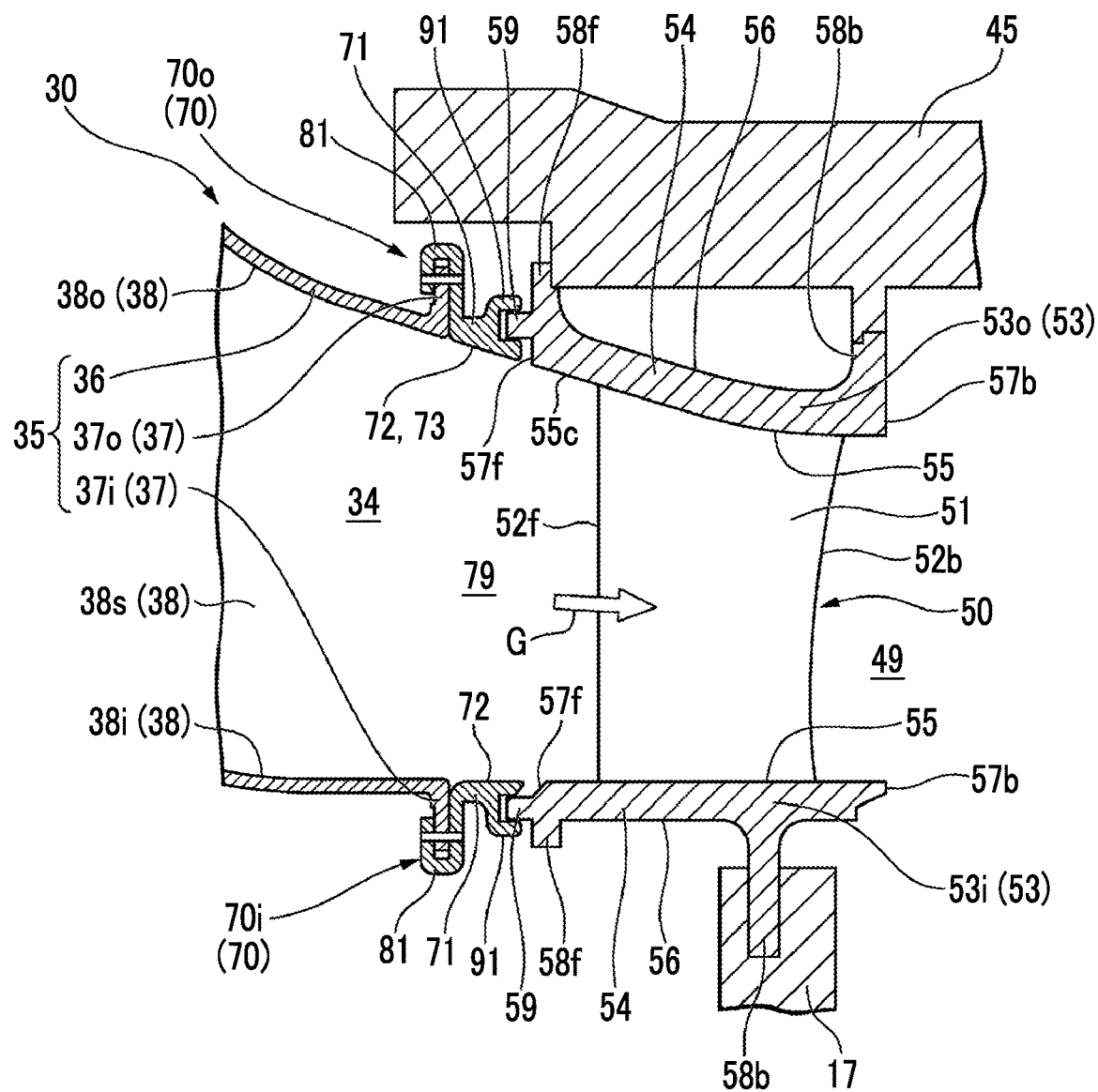
FIG. 4 is a cross-sectional view of an outlet seal and surroundings thereof according to a first embodiment of the present invention.
Figure 4:
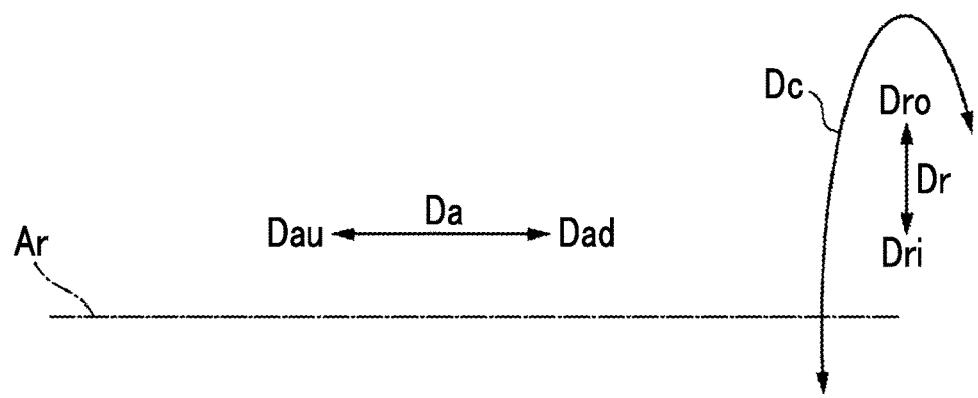

In a cross section including the axis Ar, both the outer gas path surface 38o and the inner gas path surface 38i extend in a direction including a directional component of the axial direction Da. As illustrated in FIG. 4, a downstream portion of the inner gas path surface 38i including an end on the axial downstream side Dad extends substantially in the axial direction Da. In addition, a downstream portion of the outer gas path surface 38o including an end on the axial downstream side Dad gradually extends toward the radial inner side Dri as the outer gas path surface 38o approaches the axial downstream side Dad. Namely, the downstream portion of the outer gas path surface 38o is an inclined surface that is inclined with respect to the axis Ar. Therefore, a combustion gas flow path area between the downstream portion of the inner gas path surface 38i and the downstream portion of the outer gas path surface 38o gradually decreases toward the axial downstream side Dad. The downstream portion of the outer gas path surface 38o forms a seal continuous gas path surface 38oc. Here, the combustion gas flow path area refers to an area of the combustion gas flow path when the combustion gas flow path is taken along a cross section perpendicular to the axis Ar.

The flange 37 of the transition piece 35 includes an outer flange 37o and an inner flange 37i. The outer flange 37o protrudes to an outer peripheral side of the cylinder 36 from a portion which is one end of the cylinder 36 and in which the outer gas path surface 38o is formed in the circumferential direction with respect to the combustor axis Ca. The inner flange 37i protrudes to the outer peripheral side of the cylinder 36 from a portion which is one end of the cylinder 36 and in which the inner gas path surface 38i is formed in the circumferential direction with respect to the combustor axis Ca.

As illustrated in FIG. 4, the stator vane 50 includes a vane body 51; an inner shroud 53i provided on one side of the vane body 51 in a vane height direction; and an outer shroud 53o provided on the other side of the vane body 51 in the vane height direction. Both the inner shroud 53i and the outer shroud 53o extend in a direction perpendicular to the vane height direction. The vane height direction is the radial direction Dr in a state where the stator vane 50 is attached to the turbine casing (refer to FIG. 2). In addition, one side in the vane height direction is the radial outer side Dro, and the other side in the vane height direction is the radial inner side Dri. Therefore, the inner shroud 53i is provided on the radial inner side Dri of the vane body 51, and the outer shroud 53o is provided on the radial outer side Dro of the vane body 51.

The vane body 51 includes a leading edge 52f and a trailing edge 52b. Both the leading edge 52f and the trailing edge 52b extend in the radial direction Dr that is the vane height direction. The leading edge 52f is located on the axial upstream side Dau with respect to the trailing edge 52b in a state where the stator vane 50 is attached to the turbine casing 45. The vane body 51 is disposed in the combustion gas flow path 49 through which the combustion gas G passes.

Each of the inner shroud 53i and the outer shroud 53o includes a shroud body 54, a leading leg portion 58f, a trailing leg portion 58b, and an upstream protrusion portion 59.

The shroud body 54 is a plate-shaped member that extends in a direction including a directional component perpendicular to the radial direction Dr that is the vane height direction, namely, in a direction including a directional component of the circumferential direction and in a direction including a directional component of the axial direction Da. The shroud body 54 has a gas path surface 55, an opposite gas path surface 56, a leading end surface 57f, and a trailing end surface 57b. The leading end surface 57f of the shroud body 54 of the inner shroud 53i and the outer shroud 53o is a surface facing the axial upstream side Dau.

In addition, the trailing end surface 57b of the shroud body 54 of each of the inner shroud 53i and the outer shroud 53o is a surface facing the axial downstream side Dad. The gas path surface (inner shroud gas path surface) 55 of the shroud body 54 of the inner shroud 53i is a surface that faces the radial outer side Dro and that is in contact with the combustion gas G. The opposite gas path surface 56 of the shroud body 54 of the inner shroud 53i is a surface that faces the radial inner side Dri and that is in a back-to-back relationship with the gas path surface 55. On the other hand, the gas path surface (outer shroud gas path surface) 55 of the shroud body 54 of the outer shroud 53o is a surface that faces the radial inner side Dri and that is in contact with the combustion gas G. The opposite gas path surface 56 of the shroud body 54 of the outer shroud 53o is a surface that faces the radial outer side Dro and that is in a back-to-back relationship with the gas path surface 55. The gas path surface 55 of the inner shroud 53i defines an edge on the radial inner side Dri of the combustion gas flow path having an annular shape. In addition, the gas path surface 55 of the outer shroud 53o defines an edge on the radial outer side Dro of the combustion gas flow path 49 having an annular shape.

The gas path surface 55 of the inner shroud 53i extends substantially from an edge on the radial outer side Dro of the leading end surface 57f of the shroud body 54 to the axial downstream side Dad. On the other hand, the gas path surface 55 of the outer shroud 53o gradually extends from an edge on the radial inner side Dri of the leading end surface 57f of the shroud body 54 toward the radial inner side Dri as the gas path surface 55 approaches the axial downstream side Dad. Namely, the gas path surface 55 of the outer shroud 53o is an inclined surface that is inclined with respect to the axis Ar. Therefore, a flow path area of the combustion gas flow path 49 between the gas path surface 55 of the inner shroud 53i and the gas path surface 55 of the outer shroud 53o gradually decreases toward the axial downstream side Dad. In the gas path surface 55 of the outer shroud 53o, an angle of a portion on the axial upstream side Dau from a center in the axial direction Da with respect to the axis Ar is larger than an angle of a portion on the axial downstream side Dad from the center in the axial direction Da with respect to the axis Ar. The portion of the gas path surface 55 of the outer shroud 53o on the axial upstream side Dau from the center in the axial direction Da forms a seal continuous gas path surface 55c. The seal continuous gas path surface 55c is an inclined surface.

The leading leg portion 58f of the inner shroud 53i protrudes from a portion on the axial upstream side Dau of the opposite gas path surface 56 of the shroud body 54 to the radial inner side Dri. The trailing leg portion 58b of the inner shroud 53i protrudes from a portion on the axial downstream side Dad of the opposite gas path surface in the shroud body 54 to the radial inner side Dri. Each of the leg portions 58f and 58b of the inner shroud 53i is in contact with an end on the radial outer side Dro of an inner cover 17 fixed to the gas turbine casing 15, and serves to support a portion on the radial inner side Dri of the stator vane 50 on the inner cover 17.

The leading leg portion 58f of the outer shroud 53o protrudes from a portion on the axial upstream side Dau of the opposite gas path surface 56 of the shroud body 54 to the radial outer side Dro. The trailing leg portion 58b of the outer shroud 53o protrudes from a portion on the axial downstream side Dad of the opposite gas path surface in the shroud body 54 to the radial outer side Dro. Both the leg portions 58f and 58b of the outer shroud 53o serve to fix the stator vane 50 to the turbine casing 45.

The upstream protrusion portions 59 of the inner shroud 53*i* and the outer shroud 53*o* protrude from the leading end surface 57*f* of the shroud body 54 to the axial upstream side Dau.

The outlet seal 70 is an outlet seal set including an outer outlet seal 70*o* and an inner outlet seal 70*i*. Hereinafter, a set of the outer outlet seal 70*o* and the inner outlet seal 70*i* may be referred to as the outlet seal 70, and one of the outer outlet seal 70*o* and the inner outlet seal 70*i* may be referred to as the outlet seal 70. The outer outlet seal 70*o* connects the outer flange 37*o* of the transition piece 35 and the outer shroud 53*o* of the stator vane 50. The inner outlet seal 70*i* connects the inner flange 37*i* of the transition piece 35 and the inner shroud 53*i* of the stator vane 50.

As illustrated in FIG. 1, the compressor 20 compresses the air A to generate compressed air. This compressed air flows into the combustor 30. The fuel F is supplied to the combustor 30. In the combustor 30, the fuel F is combusted in the compressed air to generate the high-temperature and high-pressure combustion gas G. The combustion gas G is delivered from the combustor 30 to the combustion gas flow path 49 inside the turbine 40. The combustion gas G rotates the turbine rotor 41 in the process of flowing through the combustion gas flow path 49 to the axial downstream side Dad.

The rotor of the generator GEN connected to the gas turbine rotor 11 is rotated by rotation of the turbine rotor 41. As a result, the generator GEN generates electricity.

Hereinafter, various embodiments of the outlet seal 70 will be described.

[First Embodiment of Outlet Seal]

Hereinafter, an outlet seal of the present embodiment will be described with reference to FIGS. 3 to 6.

As illustrated in FIG. 4, both the inner outlet seal 70*i* and the outer outlet seal 70*o* include a body portion having a circular arc shape around the axis Ar; a flange connecting portion (first connecting portion) 81 connected to the flange 37 of the transition piece 35; and a shroud connecting portion (second connecting portion) 91 connected to a shroud 53 of the stator vane 50. Namely, the inner outlet seal 70*i* and the outer outlet seal 70*o* have essentially the same structure.

Figure 5:
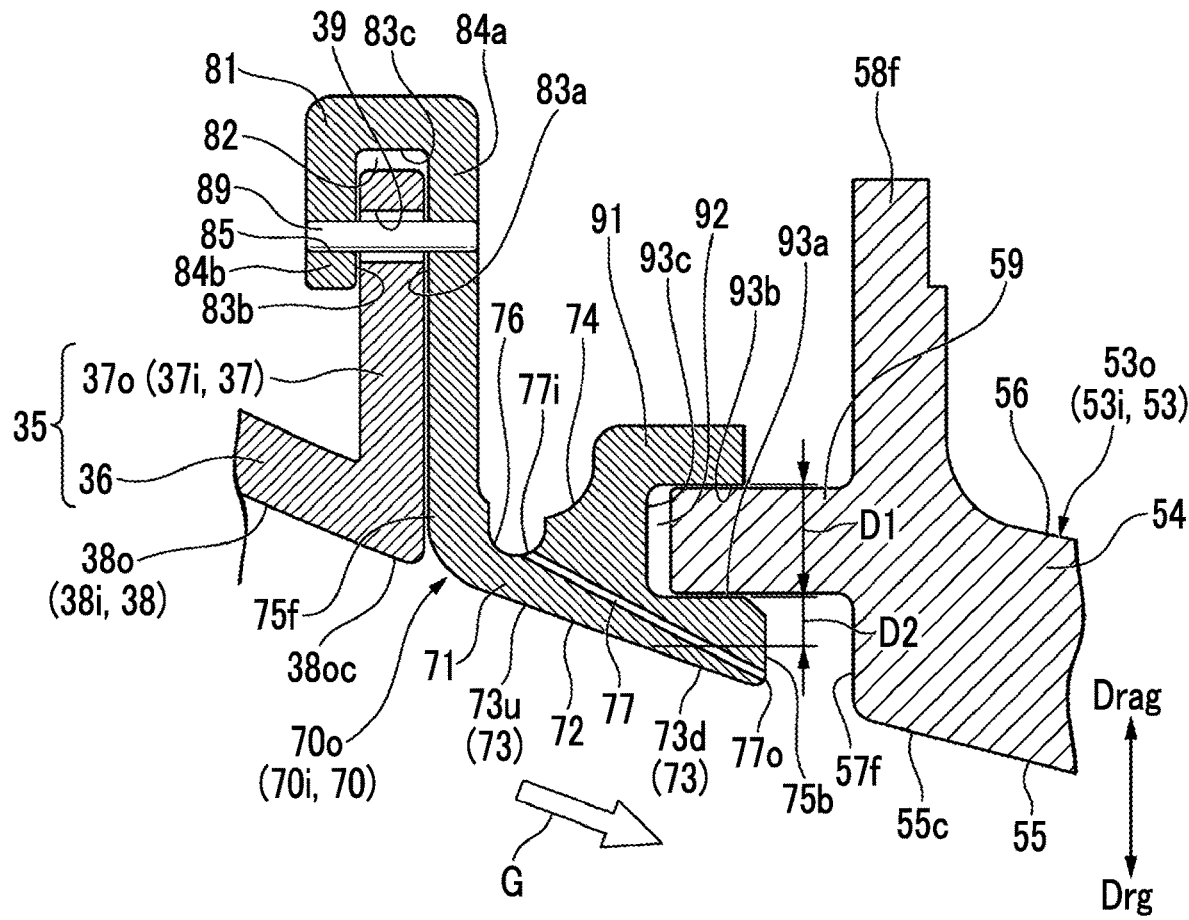
FIG. 5 is a cross-sectional view of the outlet seal according to the first embodiment of the present invention.
Figure 5:
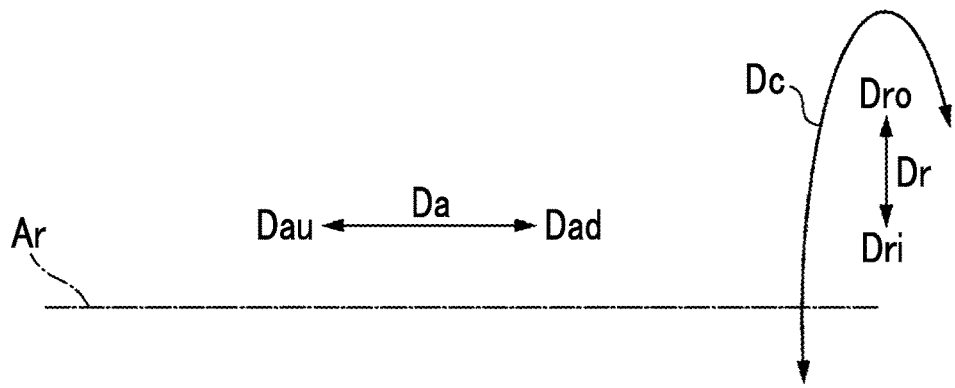

As illustrated in FIG. 5, the body portion 71 has a gas path surface 72, an opposite gas path surface 74, a combustor-side end surface 75*f*, and a stator vane-side end surface 75*b*. The gas path surface 72 is a surface that defines a part of an edge of a combustion gas flow path 79 through which the combustion gas G flows. The opposite gas path surface 74 is a surface that faces opposite to the gas path surface 72 and that is in a back-to-back relationship with the gas path surface 72. The combustor-side end surface 75*f* is an end surface on the axial upstream side Dau of the body portion 71, the end surface facing the axial upstream side Dau. The stator vane-side end surface 75*b* is an end surface on the axial downstream side Dad of the body portion 71, the end surface facing the axial downstream side Dad. As illustrated in FIG. 3, the gas path surface 72 is a circular arc surface around the axis Ar when viewed in the axial direction Da.

As illustrated in FIG. 5, the flange connecting portion 81 is provided on the axial upstream side Dau of the body portion 71 and on an opposite gas path side Drag that is opposite to the combustion gas flow path 79 with respect to the gas path surface 72 of the body portion 71 in the radial direction Dr. The flange connecting portion 81 includes a flange fitting groove 82 that is recessed to the opposite gas path side Drag. The flange fitting groove 82 is defined by a first groove side surface 83*a*, a second groove side surface 83*b*, and a groove bottom surface 83*c*. The first groove side surface 83*a* and the second groove side surface 83*b* extend in the radial direction Dr, and face each other in the axial direction Da. The first groove side surface 83*a* extends from an end on the axial upstream side Dau in the gas path surface 72 to the opposite gas path side Drag, and faces the axial upstream side Dau. The combustor-side end surface 75*f* of the body portion 71 described above forms a part of the first groove side surface 83*a*. Therefore, the flange connecting portion 81 and the body portion 71 share a part of each other. The second groove side surface 83*b* is located on the axial upstream side Dau from the first groove side surface 83*a*, and faces the axial downstream side Dad. The groove bottom surface 83*c* connects an end on the opposite gas path side Drag in the first groove side surface 83*a* and an end on the opposite gas path side Drag in the second groove side surface 83*b*, and faces a gas path side Drg opposite to the opposite gas path side Drag in the radial direction Dr. The flange 37 of the transition piece 35 enters the flange fitting groove 82. The flange fitting groove 82 restricts movement of the outlet seal 70 in the axial direction Da with respect to the flange 37.

The flange connecting portion 81 includes a first groove side plate 84*a* and a second groove side plate 84*b*. Both the first groove side plate 84*a* and the second groove side plate 84*b* are plates extending in the radial direction Dr and in the circumferential direction. The first groove side plate 84*a* and the second groove side plate 84*b* face each other at an interval in the axial direction Da. A surface of the first groove side plate 84*a* that faces the axial upstream side Dau forms the first groove side surface 83*a* described above. A surface of the second groove side plate 84*b* that faces the axial downstream side Dad forms the second groove side surface 83*b* described above. A pin hole 85 which penetrates through the first groove side plate 84*a* and the second groove side plate 84*b* in the axial direction Da and into which a pin 89 is inserted is formed in the first groove side plate 84*a* and in the second groove side plate 84*b*. In addition, a pin hole 39 which penetrates through the flange 37 of the transition piece 35 in the axial direction Da and into which the pin 89 is inserted is also formed in the flange 37. However, an inner diameter of the pin hole 39 formed in the flange 37 is larger than an inner diameter of the pin hole 85 formed in the first groove side plate 84*a* and in the second groove side plate 84*b*, and is larger than an outer diameter of the pin 89. For this reason, even when the pin 89 is inserted into the pin hole 85 of the first groove side plate 84*a* and of the second groove side plate 84*b* and into the pin hole 39 of the flange 37, the movement of the outlet seal 70 in the radial direction Dr with respect to the flange 37 is allowed to some extent.

The shroud connecting portion 91 is provided on the axial downstream side Dad of the body portion 71 and on the opposite gas path side Drag of the body portion 71. The shroud connecting portion 91 includes a shroud fitting groove 92 that is recessed to the axial upstream side Dau. The shroud fitting groove 92 is defined by a first groove side surface 93*a*, a second groove side surface 93*b*, and a groove bottom surface 93*c*. The first groove side surface 93*a* and the second groove side surface 93*b* extend in the axial direction Da, and face each other in the radial direction Dr. The first groove side surface 93*a* faces the opposite gas path side Drag. A part of the opposite gas path surface 74 of the body portion 71 described above forms a part of the first groove side surface 93*a*. Therefore, the shroud connecting portion 91 and the body portion 71 share a part of each other. The second groove side surface 93*b* is located on the opposite gas path side Drag from the first groove side surface 93*a*, and faces the gas path side Drg. The groove bottom surface 93c connects an end on the axial upstream side Dau in the first groove side surface 93a and an end on the axial upstream side Dau in the second groove side surface 93b, and faces the axial downstream side Dad. The upstream protrusion portion 59 of the shroud of the stator vane 50 enters the shroud fitting groove 92. The shroud fitting groove 92 restricts movement of the outlet seal 70 in the radial direction Dr with respect to the shroud 53 while allowing movement of the outlet seal 70 in the axial direction Da with respect to the shroud 53 to some extent.

In the process of a transition from a state where the combustion gas G does not flow through the gas turbine to a state where the combustion gas G flows therethrough, a difference in thermal expansion is generated between the transition piece 35 and the stator vane 50. Therefore, in order to absorb the difference in thermal expansion, as described above, the shroud fitting groove 92 of the outlet seal 70 restricts movement of the outlet seal 70 in the radial direction Dr with respect to the shroud while allowing movement of the outlet seal 70 in the axial direction Da with respect to the shroud 53 to some extent. In addition, as described above, the flange fitting groove 82 of the outlet seal 70 allows movement of the outlet seal 70 in the radial direction Dr with respect to the transition piece 35 to some extent while restricting movement of the outlet seal 70 in the axial direction Da with respect to the transition piece 35.

The body portion 71 further includes a cooling air passage 77 through which cooling air flows. The cooling air passage 77 includes an inlet 77i and an outlet 77o. A recess 76 that is recessed to the gas path side Drg is formed in the opposite gas path surface 74 of the body portion 71 between the flange connecting portion 81 and the shroud connecting portion 91. The inlet 77i of the cooling air passage 77 is open in the recess 76 of the opposite gas path surface 74 of the body portion 71. The outlet 77o of the cooling air passage 77 is open in the stator vane-side end surface 75b of the body portion 71. The cooling air passage 77 is inclined with respect to the gas path surface 72 to gradually approach the gas path surface 72 as the cooling air passage 77 extends from the inlet 77i toward the axial downstream side Dad.

As described above, the inner outlet seal 70i and the outer outlet seal 70o have essentially the same structure. However, a mutual relationship between the components of the outer outlet seal 70o in the radial direction Dr is opposite to a mutual relationship between the components of the inner outlet seal 70i in the radial direction Dr. For this reason, for example, the gas path surface 72 of the outer outlet seal 70o faces the radial inner side Dri, and the gas path surface 72 of the inner outlet seal 70i faces the radial outer side Dro. In addition, the flange fitting groove 82 of the outer outlet seal 70o is recessed to the radial outer side Dro, and the flange fitting groove 82 of the inner outlet seal 70i is recessed to the radial inner side Dri. In addition, an angle of the gas path surface 72 of the outer outlet seal 70o with respect to the axis Ar is different from an angle of the gas path surface 72 of the inner outlet seal 70i with respect to the axis Ar.

As illustrated in FIG. 4, the gas path surface 72 of the inner outlet seal 70i extends substantially in the axial direction Da in a cross section including the axis Ar. In a state where the inner outlet seal 70i is connected to the inner flange 37i of the transition piece 35, in a cross section including the axis Ar, the gas path surface 72 of the inner outlet seal 70i is continuous with the downstream portion of the inner gas path surface 38i of the transition piece 35 including the end on the axial downstream side Dad, with a gap therebetween. In addition, in a state where the inner outlet seal 70i is connected to the inner shroud 53i of the stator vane 50, in a cross section including the axis Ar, the gas path surface 72 of the inner outlet seal 70i is continuous with an upstream portion of the gas path surface 55 of the inner shroud 53i including an end on the axial upstream side Dau, with a gap therebetween.

As illustrated in FIG. 5, in a cross section including the axis Ar, the gas path surface 72 of the outer outlet seal 70o has an inclined surface 73 which is inclined with respect to the axis Ar such that a flow path area of the combustion gas flow path 79 decreases from the axial upstream side Dau toward the axial downstream side Dad. Therefore, in the present embodiment, the outer outlet seal 70o is the outlet seal according to the present invention. The inclined surface 73 gradually approaches the radial inner side Dri from the axial upstream side Dau toward the axial downstream side Dad in a cross section including the axis Ar. The inclined surface 73 has an upstream inclined surface (first side inclined surface) 73u that is present on the axial upstream side Dau from a groove presence region where the first groove side surface 93a of the shroud connecting portion 91 is present in the axial direction Da, and a downstream inclined surface (second side inclined surface) 73d that is present in the above-described groove presence region in the axial direction Da and that is continuous with the upstream inclined surface 73u.

A downstream inclined line (second side inclined line) where an imaginary plane including the axis Ar and the downstream inclined surface 73d intersect with each other is parallel to an upstream inclined line (first side inclined line) where an imaginary plane including the axis Ar and the upstream inclined surface 73u intersect with each other.

In a state where the outer outlet seal 70o is connected to the outer flange 37o of the transition piece 35, in a cross section including the axis Ar, the gas path surface 72 of the outer outlet seal 70o is continuous with the seal continuous gas path surface 38oc that is the downstream portion of the outer gas path surface 38o of the transition piece 35 including the end on the axial downstream side Dad, with a gap therebetween. In addition, in a state where the outer outlet seal 70o is connected to the outer shroud 53o of the stator vane 50, in a cross section including the axis Ar, the gas path surface 72 of the outer outlet seal 70o is continuous with the seal continuous gas path surface 55c that is an upstream portion of the gas path surface 55 of the outer shroud 53o including an end on the axial upstream side Dau, with a gap therebetween.

Figure 6:
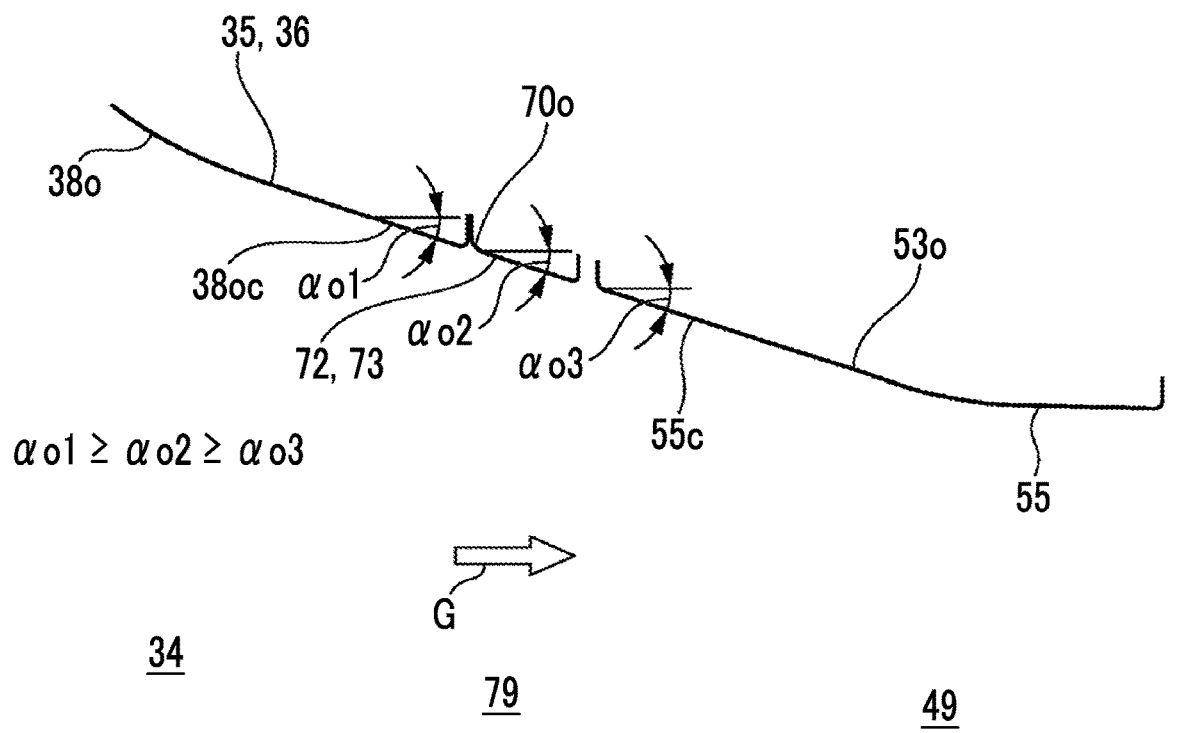
FIG. 6 is a descriptive view illustrating an angle of a gas path surface of a transition piece, an angle of a gas path surface of the outlet seal, and an angle of a gas path surface of a shroud with respect to an axis according to the first embodiment of the present invention.
Figure 6:
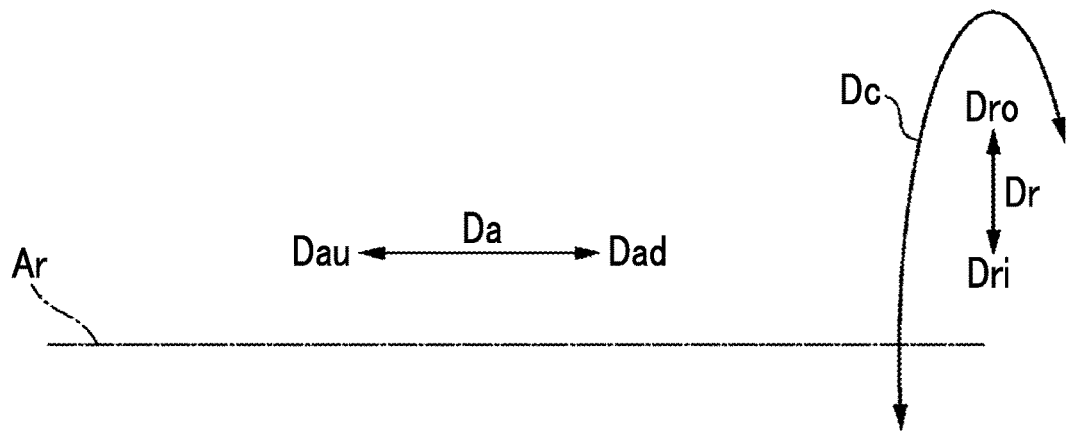

As illustrated in FIG. 6, an angle $\alpha o2$ of the inclined surface 73 of the outer outlet seal 70o with respect to the axis Ar is equal to or less than an angle $\alpha o1$ of the seal continuous gas path surface 38oc of the transition piece 35 with respect to the axis Ar. In addition, an angle $\alpha o3$ of the seal continuous gas path surface 55c of the outer shroud 53o with respect to the axis Ar is equal to or less than the angle $\alpha o2$ of the inclined surface 73 of the outer outlet seal 70o with respect to the axis Ar.

Namely, the angles have the following relationship.

$$\alpha o1 \geq \alpha o2 \geq \alpha o3$$

However, an angle difference between the angle $\alpha o1$ and the angle $\alpha o2$ is 20° or less. In addition, an angle difference between the angle $\alpha o2$ and the angle $\alpha o3$ is also 20° or less.

As illustrated in FIG. 5, a distance in the radial direction Dr between the downstream inclined surface 73d of the outer outlet seal 70o and the first groove side surface 93a of the shroud fitting groove 92 gradually increases toward the axial downstream side Dad. A distance D1 in the radial direction Dr between the first groove side surface 93a and the second groove side surface 93b of the shroud fitting groove 92 is larger than a shortest distance D2 in the radial direction Dr between the downstream inclined surface 73d and the first groove side surface 93a of the shroud fitting groove 92. At least a part of the upstream inclined surface 73u on the axial upstream side Dau is present in a region where the shroud fitting groove 92 is present in the radial direction Dr.

As described above, the downstream portion of the inner gas path surface 38i of the transition piece 35 including the end on the axial downstream side Dad is substantially parallel to the axis Ar. The gas path surface 72 of the inner outlet seal 70i is also substantially parallel to the axis Ar. In addition, the upstream portion of the gas path surface 55 of the inner shroud 53i including the end on the axial upstream side Dau is also substantially parallel to the axis Ar. Moreover, in a cross section including the axis Ar, the gas path surface 72 of the inner outlet seal 70i is continuous with the downstream portion of the inner gas path surface 38i of the transition piece 35 and with the upstream portion of the gas path surface 55 of the inner shroud 53i. Therefore, the combustion gas G that has flowed along the downstream portion of the inner gas path surface 38i of the transition piece 35 smoothly flows along the gas path surface 72 of the inner outlet seal 70i. Further, the combustion gas G that has flowed along the gas path surface 72 of the inner outlet seal 70i smoothly flows along the gas path surface 55 of the inner shroud 53i.

The seal continuous gas path surface 38oc that is the downstream portion of the outer gas path surface 38o of the transition piece 35, the gas path surface 72 of the outer outlet seal 70o, and the seal continuous gas path surface 55c that is the upstream portion of the gas path surface 55 of the outer shroud 53o are all inclined with respect to the axis Ar in the cross section such that the flow path areas of the combustion gas flow paths 49 and 79 decrease from the axial upstream side Dau toward the axial downstream side Dad. In addition, the inclination angles of these surfaces with respect to the axis Ar are substantially the same. Moreover, in a cross section including the axis Ar, the gas path surface 72 of the outer outlet seal 70o is continuous with the seal continuous gas path surface 38oc of the transition piece 35 and with the seal continuous gas path surface 55c of the outer shroud 53o. Therefore, the combustion gas G that has flowed along the seal continuous gas path surface 38oc of the outer gas path surface 38o of the transition piece 35 smoothly flows along the gas path surface 72 of the outer outlet seal 70o. Further, the combustion gas G that has flowed along the gas path surface 72 of the outer outlet seal 70o smoothly flows along the gas path surface 55 of the outer shroud 53o.

Therefore, in the present embodiment, a pressure loss in the process of delivering the combustion gas G from the transition piece 35 to the first stage stator vane 50 can be reduced. Further, in the present embodiment, the outflow of the combustion gas G to a gap between the outlet seal 70 and the flange 37 of the transition piece 35 and the outflow of the combustion gas G to a gap between the outlet seal 70 and the shroud 53 of the stator vane 50 can be suppressed.

In addition, in the present embodiment, the distance D1 in the radial direction Dr between the first groove side surface 93a and the second groove side surface 93b of the shroud fitting groove 92 is larger than the shortest distance D2 in the radial direction Dr between the downstream inclined surface 73d and the first groove side surface 93a of the shroud fitting groove 92. In other words, in the present embodiment, the shortest distance D2 in the radial direction Dr between the downstream inclined surface (second side inclined surface) 73d and the first groove side surface 93a is smaller than the distance D1 that is a groove width of the shroud fitting groove 92.

As a result, a position where the upstream protrusion portion 59 of the shroud 53 enters the shroud fitting groove 92 is provided at a position closer to the combustion gas flow path 79 in the radial direction Dr. Therefore, the combustion gas G flowing through the combustion gas flow path 79 can be prevented from leaking to the outside at a position close to the combustion gas flow path 79 in the radial direction Dr. Namely, the combustion gas G of the combustion gas flow path 79 can be prevented from entering the gap between the outlet seal 70 and the shroud 53. For this reason, the combustion gas G of the combustion gas flow path 79 can be better prevented from entering the gap between the outlet seal 70 and the shroud 53 than when the combustion gas G flowing through the combustion gas flow path 79 is prevented from leaking to the outside at a position far from the combustion gas flow path 79 in the radial direction Dr. Accordingly, a distance by which the combustion gas G of the combustion gas flow path 79 enters the gap between the outlet seal 70 and the shroud 53 is shortened, so that an increase in the temperature of the outlet seal 70 and of the shroud 53 can be suppressed. Further, when the combustion gas G enters the gap between the outlet seal 70 and the shroud 53, the amount of cooling air required to purge out the entered combustion gas G can also be reduced.

In the present embodiment, a distance in the radial direction Dr between the cooling air passage 77 of the outlet seal 70 and the gas path surface 72 gradually decreases toward the axial downstream side Dad. For this reason, in the present embodiment, a portion on the axial downstream side Dad of the gas path surface 72 can be efficiently cooled by the cooling air flowing through the cooling air passage 77.

[Second Embodiment of Outlet Seal]

Figure 7:
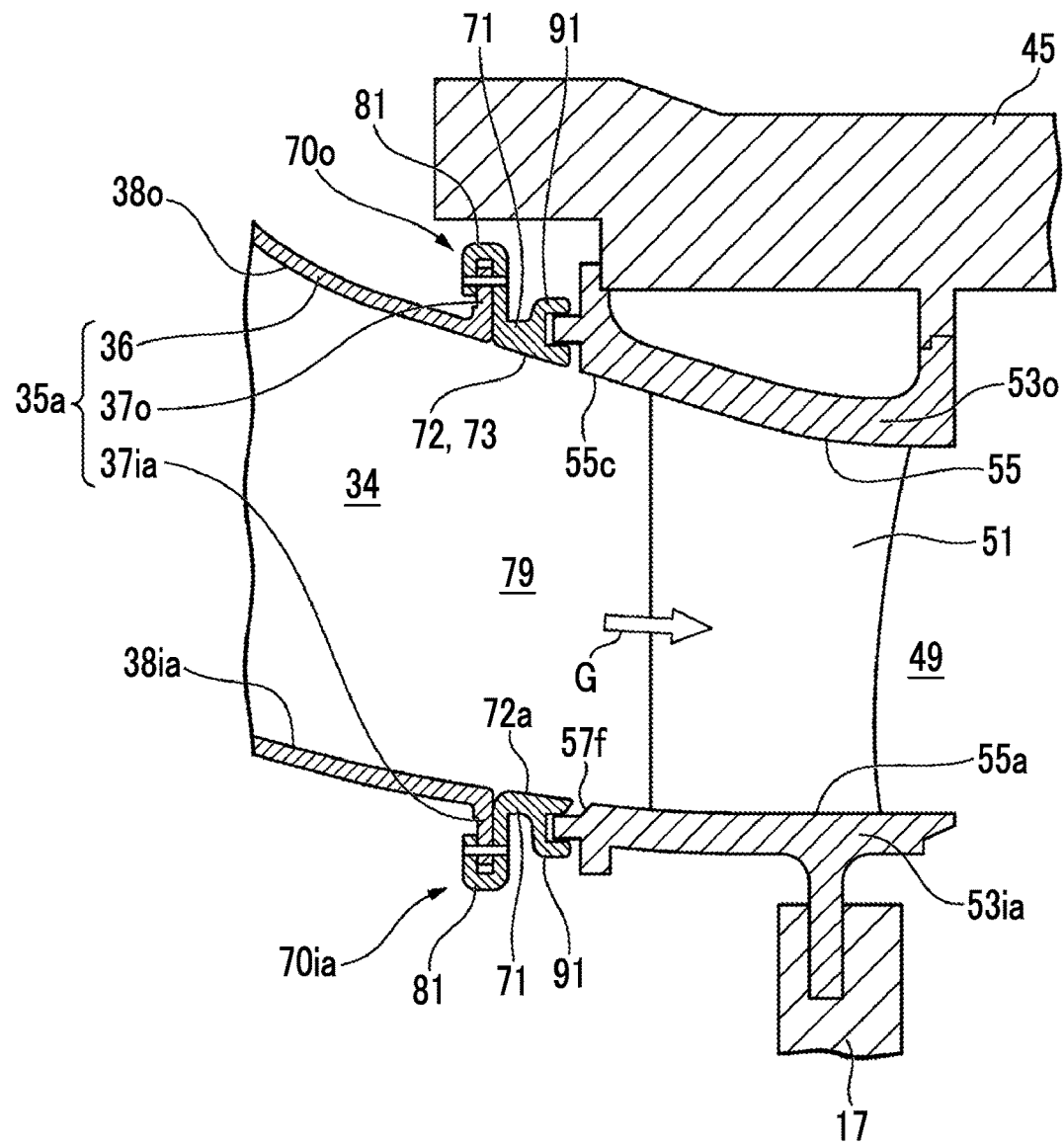
FIG. 7 is a cross-sectional view of an outlet seal and surroundings thereof according to a second embodiment of the present invention.
Figure 7:
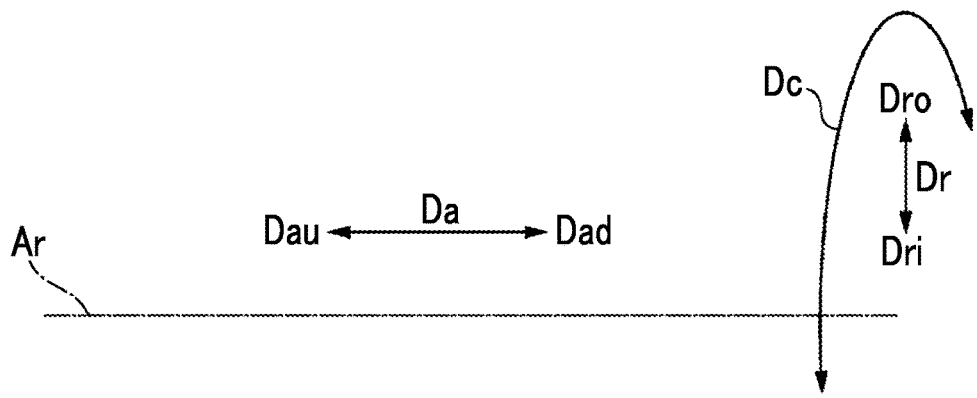

Hereinafter, an outlet seal of the present embodiment will be described with reference to FIG. 7.

The outer outlet seal 70o of the present embodiment is the same as the outer outlet seal 70o of the first embodiment. Therefore, in the present embodiment, the outer outlet seal 70o is the outlet seal according to the present invention. In addition, an inner outlet seal 70ia of the present embodiment is essentially the same as the inner outlet seal 70i of the first embodiment. However, in a cross section including the axis Ar, a gas path surface 72a of the inner outlet seal 70ia of the present embodiment gradually extends toward the radial inner side Dri as the gas path surface 72a approaches the axial downstream side Dad from the axial upstream side Dau.

Depending on the gas turbine, a downstream portion of an inner gas path surface 38ia in a transition piece 35a including an end on the axial downstream side Dad may gradually extend toward the radial inner side Dri as the inner gas path surface 38ia approaches the axial downstream side Dad. Further, a gas path surface 55a of an inner shroud 53ia may gradually extend toward the radial inner side Dri as the gas path surface 55a approaches the axial downstream side Dad from an edge on the radial outer side Dro of the leading end surface 57f of the inner shroud 53ia.

In order to cope with this case, as described above, in a cross section including the axis Ar, the gas path surface 72a of the inner outlet seal 70ia of the present embodiment gradually extends toward the radial inner side Dri as the gas path surface 72a approaches the axial downstream side Dad from the axial upstream side Dau. An angle of the gas path surface 72a of the inner outlet seal 70ia with respect to the axis Ar is equal to or less than an angle of the downstream portion of the inner gas path surface 38$ia$ of the transition piece 35$a$ with respect to the axis Ar. In addition, an angle of an upstream portion of the gas path surface 72$a$ of the inner shroud 53$ia$ with respect to the axis Ar is equal to or less than the angle of the gas path surface 72$a$ of the inner outlet seal 70$ia$ with respect to the axis Ar. However, an angle difference between the angles is 20° or less.

As described above, the gas path surface 72$a$ of the inner outlet seal 70$ia$ may gradually extend toward the radial inner side Dri as the gas path surface 72$a$ approaches the axial downstream side Dad.

[Third Embodiment of Outlet Seal]

Figure 8:
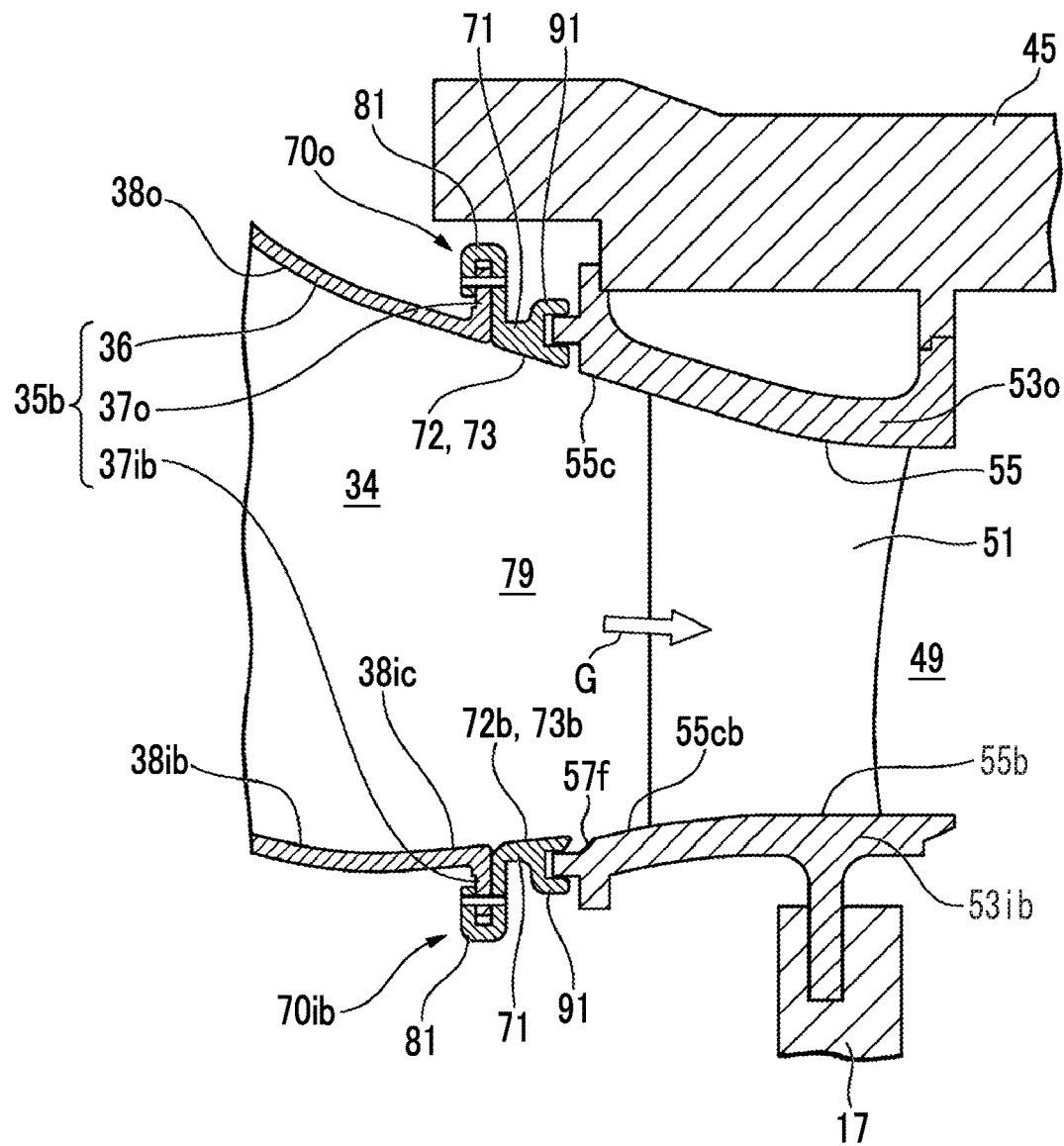
FIG. 8 is a cross-sectional view of an outlet seal and surroundings thereof according to a third embodiment of the present invention.
Figure 8:
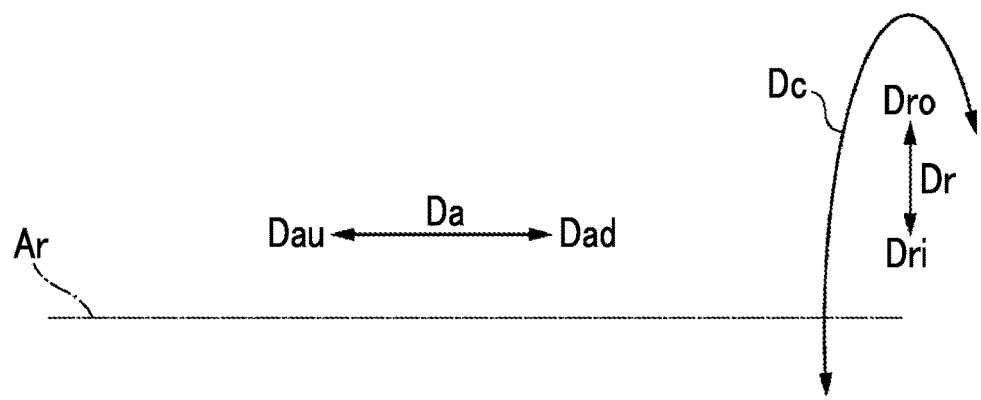

Hereinafter, an outlet seal of the present embodiment will be described with reference to FIGS. 8 and 9.

The outer outlet seal 70$o$ of the present embodiment is the same as the outer outlet seal 70$o$ of the first embodiment. Therefore, in the present embodiment, the outer outlet seal 70$o$ is the outlet seal according to the present invention. In addition, an inner outlet seal 70$ib$ of the present embodiment is essentially the same as the inner outlet seal 70$i$ of the first embodiment. However, in a cross section including the axis Ar, a gas path surface 72$b$ of the inner outlet seal 70$ib$ of the present embodiment gradually extends toward the radial outer side Dro as the gas path surface 72$b$ approaches the axial downstream side Dad from the axial upstream side Dau.

Depending on the gas turbine, a downstream portion of an inner gas path surface 38$ib$ of a transition piece 35$b$ including an end on the axial downstream side Dad may gradually extend toward the radial outer side Dro as the inner gas path surface 38$ib$ approaches the axial downstream side Dad. Further, a gas path surface 55$b$ of an inner shroud 53$ib$ may gradually extend toward the radial outer side Dro as the gas path surface 55$b$ approaches the axial downstream side Dad from an edge on the radial outer side Dro of the leading end surface 57$f$ of the inner shroud 53$ib$.

In order to cope with this case, as described above, in a cross section including the axis Ar, the gas path surface 55$b$ of the inner outlet seal 70$ib$ of the present embodiment gradually extends toward the radial outer side Dro as the gas path surface 55$b$ approaches the axial downstream side Dad from the axial upstream side Dau. Namely, in a cross section including the axis Ar, the gas path surface 72$b$ of the inner outlet seal 70$ib$ has an inclined surface 73$b$ which is inclined with respect to the axis Ar such that the flow path area of the combustion gas flow path 79 decreases from the axial upstream side Dau toward the axial downstream side Dad. Therefore, in the present embodiment, the inner outlet seal 70$ib$ is also the outlet seal according to the present invention.

In a state where the inner outlet seal 70$ib$ is connected to the inner flange 37$i$ of the transition piece 35$b$, in a cross section including the axis Ar, the gas path surface 72$b$ of the inner outlet seal 70$ib$ is continuous with a seal continuous gas path surface 38$ic$ that is the downstream portion of the inner gas path surface 38$ib$ of the transition piece 35$b$ including the end on the axial downstream side Dad, with a gap therebetween. In addition, in a state where the inner outlet seal 70$ib$ is connected to the inner shroud 53$ib$, in a cross section including the axis Ar, the gas path surface 72$b$ of the inner outlet seal 70$ib$ is continuous with a seal continuous gas path surface 55$cb$ that is an upstream portion of the gas path surface 55$b$ of the inner shroud 53$ib$ including an end on the axial upstream side Dau, with a gap therebetween. The seal continuous gas path surface 55$cb$ is an inclined surface.

Figure 9:
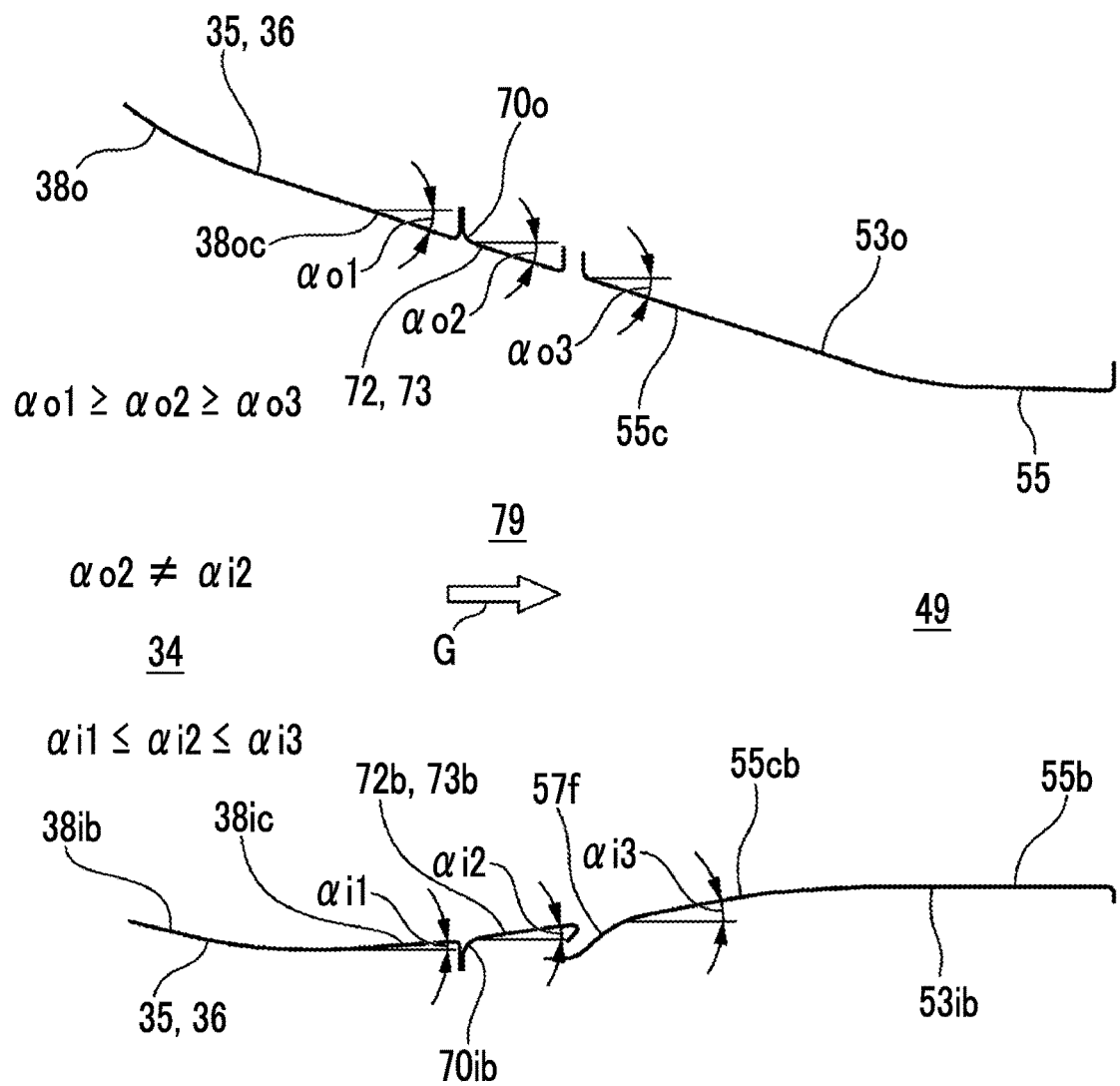
FIG. 9 is a descriptive view illustrating an angle of a gas path surface of a transition piece, an angle of a gas path surface of the outlet seal, and an angle of a gas path surface of a shroud with respect to an axis according to the third embodiment of the present invention.
Figure 9:
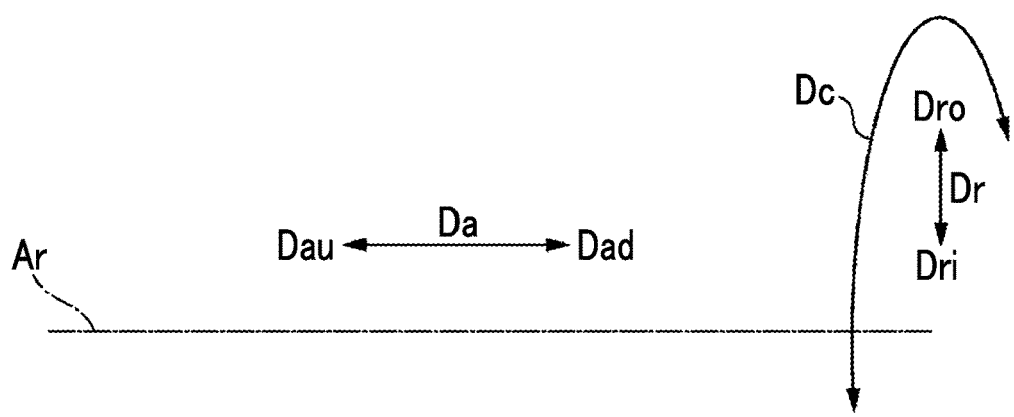

As illustrated in FIG. 9, an angle $\alpha i2$ of the inclined surface 73$b$ of the inner outlet seal 70$ib$ with respect to the axis Ar is equal to or greater than an angle $\alpha i1$ of the seal continuous gas path surface 38$ic$ of the transition piece 35$b$ with respect to the axis Ar. In addition, an angle $\alpha i3$ of the seal continuous gas path surface 55$cb$ of the inner shroud 53$ib$ with respect to the axis Ar is equal to or greater than the angle $\alpha i2$ of the inclined surface 73$b$ of the inner outlet seal 70$ib$ with respect to the axis Ar. Namely, the angles have the following relationship.

$$\alpha i1 \leq \alpha i2 \leq \alpha i3$$

However, an angle difference between the angle $\alpha i1$ and the angle $\alpha i2$ is 20° or less. In addition, an angle difference between the angle $\alpha i2$ and the angle $\alpha i3$ is also 20° or less.

The seal continuous gas path surface 38$ic$ that is the downstream portion of the inner gas path surface 38$ib$ of the transition piece 35$b$, the gas path surface 72$b$ of the inner outlet seal 70$ib$, and the seal continuous gas path surface 55$cb$ that is the upstream portion of the gas path surface 55$b$ of the inner shroud 53$ib$ are all inclined with respect to the axis Ar in the cross section such that the flow path areas of the combustion gas flow paths 49 and 79 decrease from the axial upstream side Dau toward the axial downstream side Dad. In addition, the inclination angles of these surfaces with respect to the axis Ar are substantially the same. Moreover, in a cross section including the axis Ar, the gas path surface 72$b$ of the inner outlet seal 70$ib$ is continuous with the seal continuous gas path surface 38$ic$ of the transition piece 35$b$ and with the seal continuous gas path surface 55$cb$ of the inner shroud 53$ib$. Therefore, the combustion gas G that has flowed along the seal continuous gas path surface 38$ic$ of the inner gas path surface 38$ib$ of the transition piece 35$b$ smoothly flows along the gas path surface 72$b$ of the inner outlet seal 70$ib$. Further, the combustion gas G that has flowed along the gas path surface 72$b$ of the inner outlet seal 70$ib$ smoothly flows along the gas path surface 55$b$ of the inner shroud 53$ib$.

Therefore, in the present embodiment, a pressure loss in the process of delivering the combustion gas G from the transition piece 35$b$ to the first stage stator vane can be reduced. Further, in the present embodiment, the outflow of the combustion gas to a gap between the outlet seal and the flange of the transition piece and the outflow of the combustion gas to a gap between the outlet seal and the shroud of the stator vane can be suppressed.

The gas path surface of the outlet seal in each of the above embodiments may include a curved surface. In addition, the inclined surface in the gas path surface of the outlet seal in each of the above embodiments may include a curved surface.

INDUSTRIAL APPLICABILITY

According to one aspect of the present invention, a pressure loss in the process of delivering the combustion gas from the combustor to the first stage stator vane can be reduced, and the outflow of the combustion gas to a gap between components to be connected can be suppressed.

REFERENCE SIGNS LIST

10: Gas turbine
11: Gas turbine rotor
15: Gas turbine casing
16: Intermediate casing
17: Inner cover 20: Compressor
21: Compressor rotor
22: Rotor shaft
23: Rotor blade row
23a: Rotor blade
25: Compressor casing
26: Stator vane row
26a: Stator vane
30: Combustor
31: Burner
32: Burner frame
34: Combustion space
35, 35a, 35b: Transition piece
36: Cylinder
37: Flange
37i: Inner flange
37o: Outer flange
38: Gas path surface (combustor gas path surface)
38i: Inner gas path surface (combustor inner gas path surface)
38o: Outer gas path surface (combustor outer gas path surface)
38oc, 38ic: Seal continuous gas path surface
38s: Peripheral gas path surface (combustor peripheral gas path surface)
39: Pin hole
40: Turbine
41: Turbine rotor
42: Rotor shaft
43: Rotor blade row
43a: Rotor blade
45: Turbine casing
46: Stator vane row
46a: Stator vane
49: Combustion gas flow path
50: Stator vane (first stage stator vane)
51: Vane body
52f: Leading edge
52b: Trailing edge
53o: Outer shroud
53i, 53ia, 53ib: Inner shroud
54: Shroud body
55, 55a, 55b: Gas path surface
55c, 55cb: Seal continuous gas path surface
56: Opposite gas path surface
57f: Leading end surface
57b: Trailing end surface
58f: Leading leg portion
58b: Trailing leg portion
59: Upstream protrusion portion
70: Outlet seal
70i, 70ia, 70ib: Inner outlet seal
70o: Outer outlet seal
71: Body portion
72, 72a, 72b: Gas path surface
73, 73b: Inclined surface
73u: Upstream inclined surface (first side inclined surface)
73d: Downstream inclined surface (second side inclined surface)
74: Opposite gas path surface
75f: Combustor-side end surface
75b: Stator vane-side end surface
76: Recess
77: Cooling air passage
77i: Inlet
77o: Outlet
79: Combustion gas flow path
81: Flange connecting portion (first connecting portion)
82: Flange fitting groove
83a: First groove side surface
83b: Second groove side surface
83c: Groove bottom surface
84a: First groove side plate
84b: Second groove side plate
85: Pin hole
89: Pin
91: Shroud connecting portion (second connecting portion)
92: Shroud fitting groove
93a: First groove side surface
93b: Second groove side surface
93c: Groove bottom surface
A: Air
F: Fuel
G: Combustion gas
Ar: Axis
Ca: Combustor axis
Da: Axial direction
Dau: Axial upstream side (first side)
Dad: Axial downstream side (second side)
Dc: Circumferential direction
Dr: Radial direction
Dri: Radial inner side
Dro: Radial outer side
Drg: Gas path side
Drag: Opposite gas path side

The invention claimed is:

1. An outlet seal that connects a combustor that combusts fuel to generate a combustion gas, and a shroud of a stator vane of a turbine into which the combustion gas from the combustor flows, the seal comprising:

a gas path surface that has a circular arc shape around an axis in a cross section perpendicular to the axis, and that defines a part of an outer edge of a combustion gas flow path through which the combustion gas flows;

a first connecting portion formed on a first side, and a second side, in an axial direction where the axis extends, to be connected to the combustor; and a second connecting portion formed on the second side in the axial direction to be connected to the shroud, wherein the gas path surface has an inclined surface that is inclined with respect to the axis in a cross section including the axis such that a flow path area of the combustion gas flow path decreases from the first side toward the second side, the second connecting portion includes a shroud fitting groove that is recessed to the first side, the shroud fitting groove is defined by a first groove side surface and a second groove side surface that extend in the axial direction and that face each other in a radial direction with respect to the axis, and a groove bottom surface that connects a first side of the first groove side surface and a first side of the second groove side surface and that faces the second side, the first groove side surface faces opposite to the gas path surface in the radial direction, and the inclined surface has a first side inclined surface that is present on the first side from a groove presence region where the first groove side surface is present in the axial direction, and a second side inclined surface that is present in the groove presence region in the axial direction and that is continuous with the first side inclined surface.

2. The outlet seal according to claim 1,
wherein a distance in the radial direction between the second side inclined surface and the first groove side surface gradually increases toward the second side.

3. The outlet seal according to claim 2,
wherein a distance in the radial direction between the first groove side surface and the second groove side surface is larger than a shortest distance in the radial direction between the second side inclined surface and the first groove side surface.

4. The outlet seal according to claim 1,
wherein at least a part of the first side inclined surface on the first side is present in a region where the shroud fitting groove is present in the radial direction.

5. The outlet seal according to claim 1,
wherein a second inclined line where an imaginary plane including the axis and the second side inclined surface intersect with each other is parallel to a first inclined line where the imaginary plane and the first side inclined surface intersect with each other.

6. The outlet seal according to claim 1, further comprising:
an opposite gas path surface facing opposite to the gas path surface in a radial direction with respect to the axis; and
a cooling air passage extending between the gas path surface and the opposite gas path surface in a direction including a directional component of the axial direction,
wherein the cooling air passage includes an inlet that is open in the opposite gas path surface.

7. The outlet seal according to claim 6,
wherein a distance in the radial direction between the cooling air passage and the gas path surface gradually decreases toward the second side.

8. The outlet seal according to claim 1,
wherein the gas path surface faces a radial inner side with respect to the axis, and
the inclined surface in the gas path surface is inclined to approach the axis as the inclined surface extends from the first side toward the second side.

9. An outlet seal set comprising:
an outer outlet seal that is the outlet seal according to claim 8; and
an inner outlet seal that connects the combustor and a second shroud of the stator vane of the turbine into which the combustion gas from the combustor flows, the inner outlet seal comprising:
a second gas path surface that has a second circular arc shape around the axis in the cross section perpendicular to the axis, and that defines a second part of a second outer edge of the combustion gas flow path through which the combustion gas flows;
a third connecting portion formed on the first side in the axial direction to be connected to the combustor; and
a fourth connecting portion formed on the second side in the axial direction to be connected to the second shroud,
wherein the second gas path surface has a second inclined surface that is inclined with respect to the axis in the cross section including the axis such that the flow path area of the combustion gas flow path decreases from the first side toward the second side,
wherein the second gas path surface faces a radial outer side with respect to the axis, and the second inclined surface in the second gas path surface is inclined away from the axis as the second inclined surface extends from the first side toward the second side,
wherein an angle between the second inclined surface in the second gas path surface of the inner outlet seal and the axis is different from an angle between the inclined surface in the gas path surface of the outer outlet seal and the axis.

10. The outlet seal according to claim 1,
wherein the gas path surface faces a radial outer side with respect to the axis, and
the inclined surface in the gas path surface is inclined away from the axis as the inclined surface extends from the first side toward the second side.

11. A gas turbine comprising:
the outlet seal according to claim 1;
the combustor; and
the turbine,
wherein the combustor includes a transition piece extending in a direction including a directional component of the axial direction, and a burner that sprays fuel into a combustion space that is a space on an inner peripheral side of the transition piece,
the turbine includes a turbine rotor that rotates around the axis, a turbine casing that covers the turbine rotor, and a plurality of stator vane rows attached to the turbine casing,
the turbine rotor includes a rotor shaft around the axis and a plurality of rotor blade rows attached to the rotor shaft,
the plurality of rotor blade rows are arranged in the axial direction,
each of the plurality of stator vane rows is disposed on an axial upstream side from one rotor blade row of the plurality of rotor blade rows with respect to the axis,
each of the plurality of stator vane rows includes a plurality of stator vanes arranged in a circumferential direction with respect to the axis,
each of the plurality of stator vanes includes a vane body extending in a radial direction with respect to the axis, and the shroud formed at an end of the vane body in the radial direction,
the outlet seal connects the transition piece of the combustor and the shroud of a first stage stator vane of a first stage stator vane row located on a most axial upstream side among the plurality of stator vane rows, and
the first side in the axial direction is the axial upstream side, and the second side in the axial direction is an axial downstream side opposite to the axial upstream side in the axial direction.

12. An outlet seal that connects a combustor that combusts fuel to generate a combustion gas, and a shroud of a stator vane of a turbine into which the combustion gas from the combustor flows, the seal comprising:
a gas path surface that has a circular arc shape around an axis in a cross section perpendicular to the axis, and that defines a part of an outer edge of a combustion gas flow path through which the combustion gas flows;
a first connecting portion formed on a first side, and a second side, in an axial direction where the axis extends, to be connected to the combustor; and
a second connecting portion formed on the second side in the axial direction to be connected to the shroud,
wherein the gas path surface has an inclined surface that is inclined with respect to the axis in a cross section including the axis such that a flow path area of the combustion gas flow path decreases from the first side toward the second side, the first connecting portion includes a combustor fitting groove that is recessed to an opposite gas path side that is opposite to the combustion gas flow path with respect to the gas path surface in a radial direction with respect to the axis, the combustor fitting groove is defined by a first groove side surface and a second groove side surface that extend in the radial direction and that face each other in the axial direction, and a groove bottom surface that connects an end on the opposite gas path side in the first groove side surface and an end on the opposite gas path side in the second groove side surface and that faces a gas path side that is a side on which the combustion gas flow path is present with respect to the gas path surface in the radial direction, and the first groove side surface of the combustor fitting groove extends from an end on the first side in the gas path surface to the opposite gas path side, and faces the first side.

13. The outlet seal according to claim 12, wherein a distance in the radial direction between the second side inclined surface and the first groove side surface gradually increases toward the second side.

14. A gas turbine comprising:

the outlet seal according to claim 12;

the combustor; and the turbine, wherein the combustor includes a transition piece extending in a direction including a directional component of the axial direction, and a burner that sprays fuel into a combustion space that is a space on an inner peripheral side of the transition piece, the turbine includes a turbine rotor that rotates around the axis, a turbine casing that covers the turbine rotor, and a plurality of stator vane rows attached to the turbine casing, the turbine rotor includes a rotor shaft around the axis and a plurality of rotor blade rows attached to the rotor shaft, the plurality of rotor blade rows are arranged in the axial direction, each of the plurality of stator vane rows is disposed on an axial upstream side from one rotor blade row of the plurality of rotor blade rows with respect to the axis, each of the plurality of stator vane rows includes a plurality of stator vanes arranged in a circumferential direction with respect to the axis, each of the plurality of stator vanes includes a vane body extending in a radial direction with respect to the axis, and the shroud formed at an end of the vane body in the radial direction, the outlet seal connects the transition piece of the combustor and the shroud of a first stage stator vane of a first stage stator vane row located on a most axial upstream side among the plurality of stator vane rows, and the first side in the axial direction is the axial upstream side, and the second side in the axial direction is an axial downstream side opposite to the axial upstream side in the axial direction.

15. A gas turbine assembly comprising:

a combustor that combusts fuel to generate a combustion gas;

a turbine into which the combustion gas from the combustor flows; and an outlet seal that connects the combustor and a shroud of a stator vane of the turbine, the outlet seal including:

a gas path surface that has a circular arc shape around an axis in a cross section perpendicular to the axis, and that defines a part of an outer edge of a combustion gas flow path through which the combustion gas flows;

a first connecting portion formed on a first side, and a second side, in an axial direction where the axis extends, to be connected to the combustor; and a second connecting portion formed on the second side in the axial direction to be connected to the shroud;

wherein the gas path surface has an inclined surface that is inclined with respect to the axis in a cross section including the axis such that a flow path area of the combustion gas flow path decreases from the first side toward the second side, the combustor includes a transition piece extending in a direction including a directional component of the axial direction, and a burner that sprays fuel into a combustion space that is a space on an inner peripheral side of the transition piece, the turbine includes a turbine rotor that rotates around the axis, a turbine casing that covers the turbine rotor, and a plurality of stator vane rows attached to the turbine casing, the turbine rotor includes a rotor shaft around the axis and a plurality of rotor blade rows attached to the rotor shaft, the rotor blade rows are arranged in the axial direction, each of the stator vane rows is disposed on an axial upstream side from one rotor blade row of the plurality of rotor blade rows with respect to the axis, each of the stator vane rows includes a plurality of stator vanes arranged in a circumferential direction with respect to the axis, each of the stator vanes includes a vane body extending in a radial direction with respect to the axis, and the shroud formed at an end of the vane body in the radial direction, the outlet seal connects the transition piece of the combustor and the shroud of a first stage stator vane of a first stage stator vane row located on a most axial upstream side among the plurality of stator vane rows, the first side in the axial direction is the axial upstream side, and the second side in the axial direction is an axial downstream side opposite to the axial upstream side in the axial direction, the shroud of the first stage stator vane has a shroud gas path surface that faces a side on which the vane body is present with respect to the shroud gas path surface, and that defines a part of an outer edge of a combustion gas flow path through which the combustion gas flows in the first stage stator vane, the transition piece includes a cylinder that extends in the direction including the directional component of the axial direction to form the combustion space on an inner peripheral side of the cylinder, and a flange protruding from axial downstream side of the cylinder toward an outer peripheral side of the cylinder, an inner peripheral surface of the cylinder forms a combustor gas path surface that defines an outer edge of the combustion space, and the outlet seal connects the shroud of the first stage stator vane and the flange of the transition piece such that the gas path surface is continuous with a part of the combustor gas path surface in a second direction including a second directional component of the axial direction and the gas path surface is continuous with a part of the shroud gas path surface in a third direction including a third directional component of the axial direction.

\* \* \* \* \*